(12) United States Patent
Kettavong

(10) Patent No.: US 11,603,636 B2
(45) Date of Patent: Mar. 14, 2023

(54) INTERLOCKING MODULAR SMART SEAWALL DIVERSION AND RECREATION SYSTEM AND METHOD OF INSTALLATION

(71) Applicant: Pepsy M. Kettavong, Rochester, NY (US)

(72) Inventor: Pepsy M. Kettavong, Rochester, NY (US)

( * ) Notice: Subject to any disclaimer, the term of this patent is extended or adjusted under 35 U.S.C. 154(b) by 0 days.

(21) Appl. No.: 17/864,243

(22) Filed: Jul. 13, 2022

(65) Prior Publication Data

US 2023/0018574 A1    Jan. 19, 2023

Related U.S. Application Data

(60) Provisional application No. 63/221,102, filed on Jul. 13, 2021.

(51) Int. Cl.
    *E02B 3/06*      (2006.01)
    *E02B 3/10*      (2006.01)
    *A01K 61/70*     (2017.01)
    *E02B 3/14*      (2006.01)

(52) U.S. Cl.
    CPC ............... *E02B 3/06* (2013.01); *A01K 61/70* (2017.01); *E02B 3/10* (2013.01); *E02B 3/14* (2013.01)

(58) Field of Classification Search
    CPC ..... E02B 3/06; E02B 3/10; E02B 3/14; E02B 3/046; A01K 61/70
See application file for complete search history.

(56) References Cited

U.S. PATENT DOCUMENTS

| | | | | |
|---|---|---|---|---|
| 910,421 A | * | 1/1909 | Schlueter | E02D 5/04 405/278 |
| 4,784,521 A | * | 11/1988 | Martin | E02B 3/06 405/28 |
| 5,087,150 A | * | 2/1992 | McCreary | E02B 3/06 405/16 |
| 2004/0120768 A1 | * | 6/2004 | Yang | E02B 3/06 405/27 |

(Continued)

FOREIGN PATENT DOCUMENTS

| | | | | |
|---|---|---|---|---|
| JP | 09279540 | * | 10/1997 | Y02A 10/11 |
| JP | 2001308157 | * | 11/2004 | Y02A 40/81 |
| RU | 2459032 C1 | | 8/2012 | |

*Primary Examiner* — Carib A Oquendo
(74) *Attorney, Agent, or Firm* — Vincent G. LoTempio

(57) ABSTRACT

An interlocking modular smart seawall diversion and recreation system provides step-shaped diverter sections arranged side-by-side along a shoreline. The diverter sections slope from a base end up towards an upper end. To break kinetic energy of waves, and divert waves, the diverter sections form steps with curved risers and horizontal treads. The system forms a diversion path for the waves that reach the upper end of the modular walls and recirculate the wave energy back to divertor chamber and natural environment. Foundation pilings project into the ground and extend up to support the wall sections. The bottom end of foundation pilings terminates at sheared attachments having a tapered cross section and an edge for securely anchoring into the ground. A platform atop the diverter sections provides a pathway; a lighted platform for recreational activities; and transparent skylight portals for observing aquatic wildlife in water below and creating an indigenous ecosystem.

20 Claims, 15 Drawing Sheets

(56) References Cited

U.S. PATENT DOCUMENTS

| | | | |
|---|---|---|---|
| 2006/0104719 A1* | 5/2006 | Fainman | E02B 3/06 405/23 |
| 2006/0275081 A1* | 12/2006 | Medina Folgado | E02B 3/06 405/15 |
| 2008/0240861 A1* | 10/2008 | Phillips | E02B 3/10 405/114 |
| 2012/0177445 A1* | 7/2012 | Wendt | E02D 5/285 405/231 |
| 2021/0115639 A1* | 4/2021 | Kettavong | E02B 3/06 |

* cited by examiner

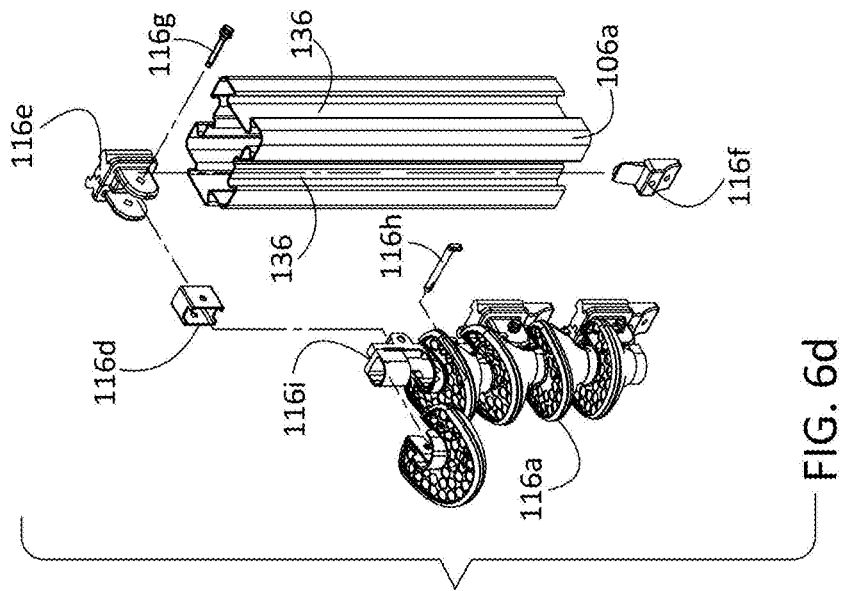
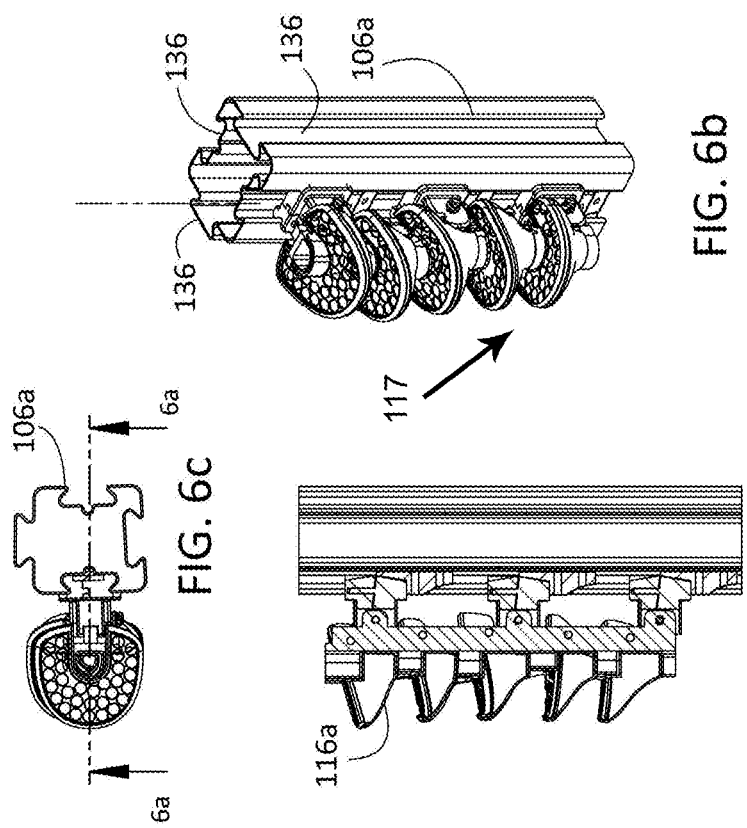
FIG. 6d
FIG. 6b
FIG. 6c
FIG. 6a

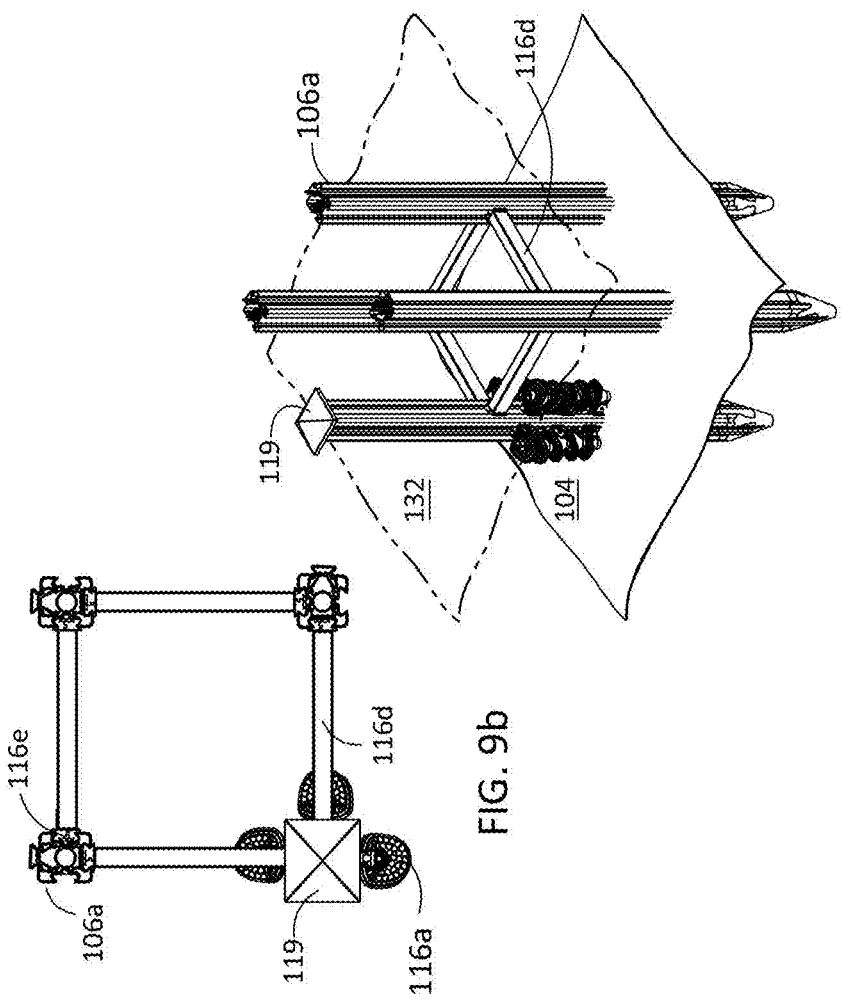
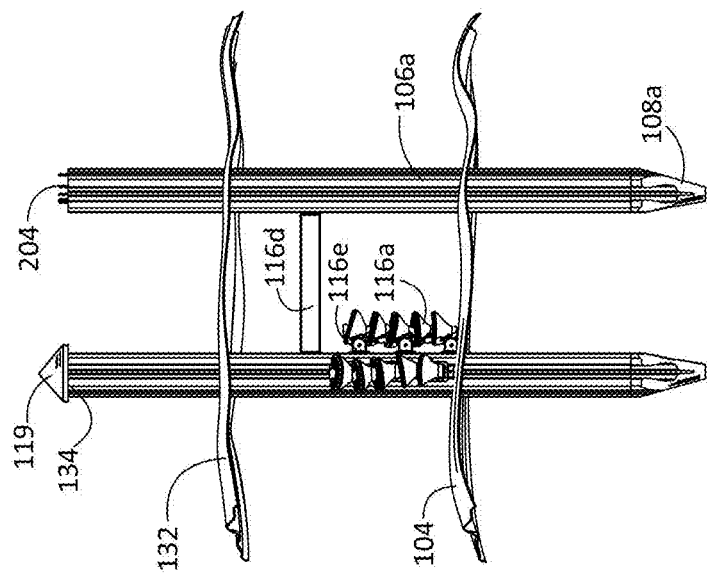

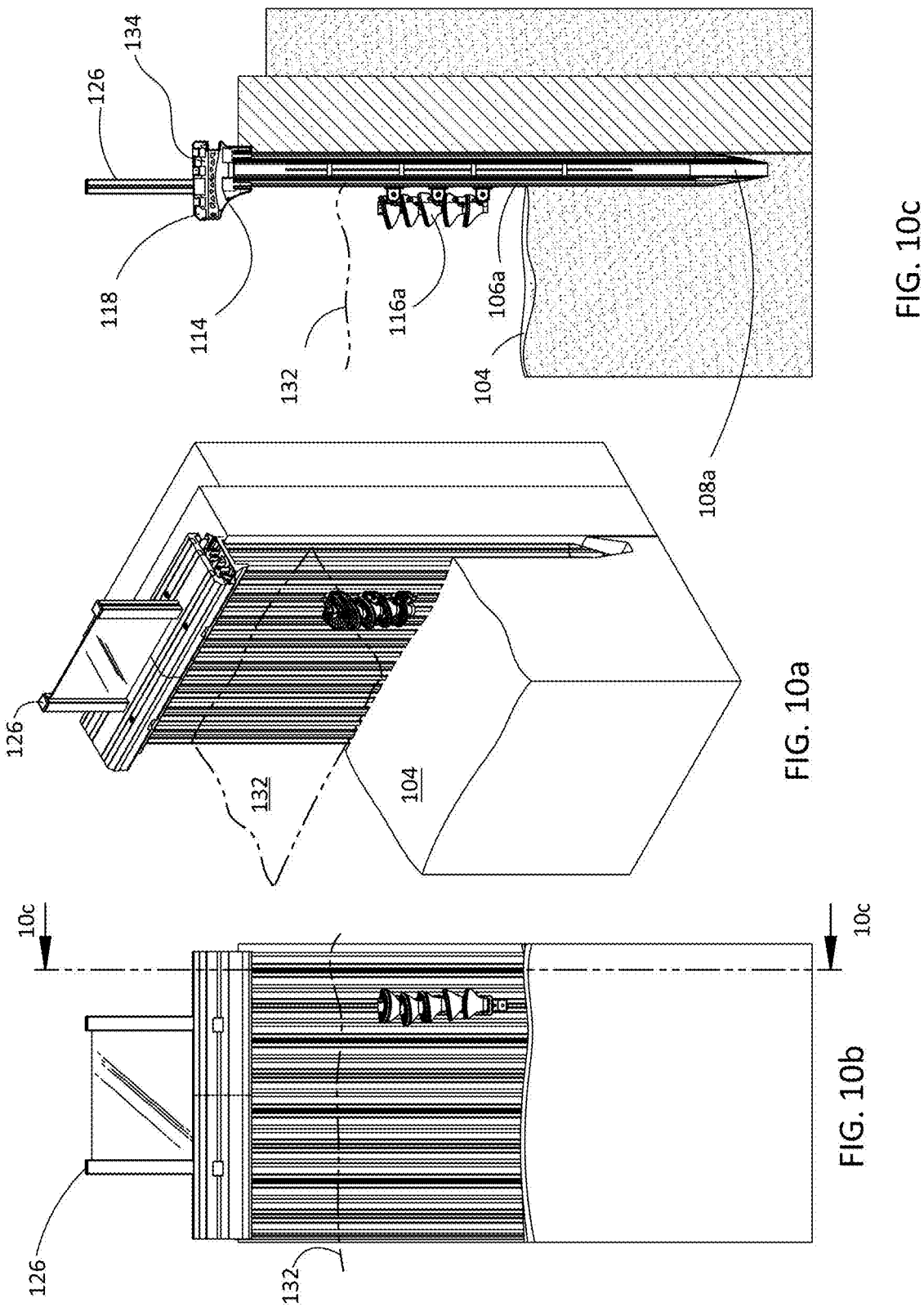

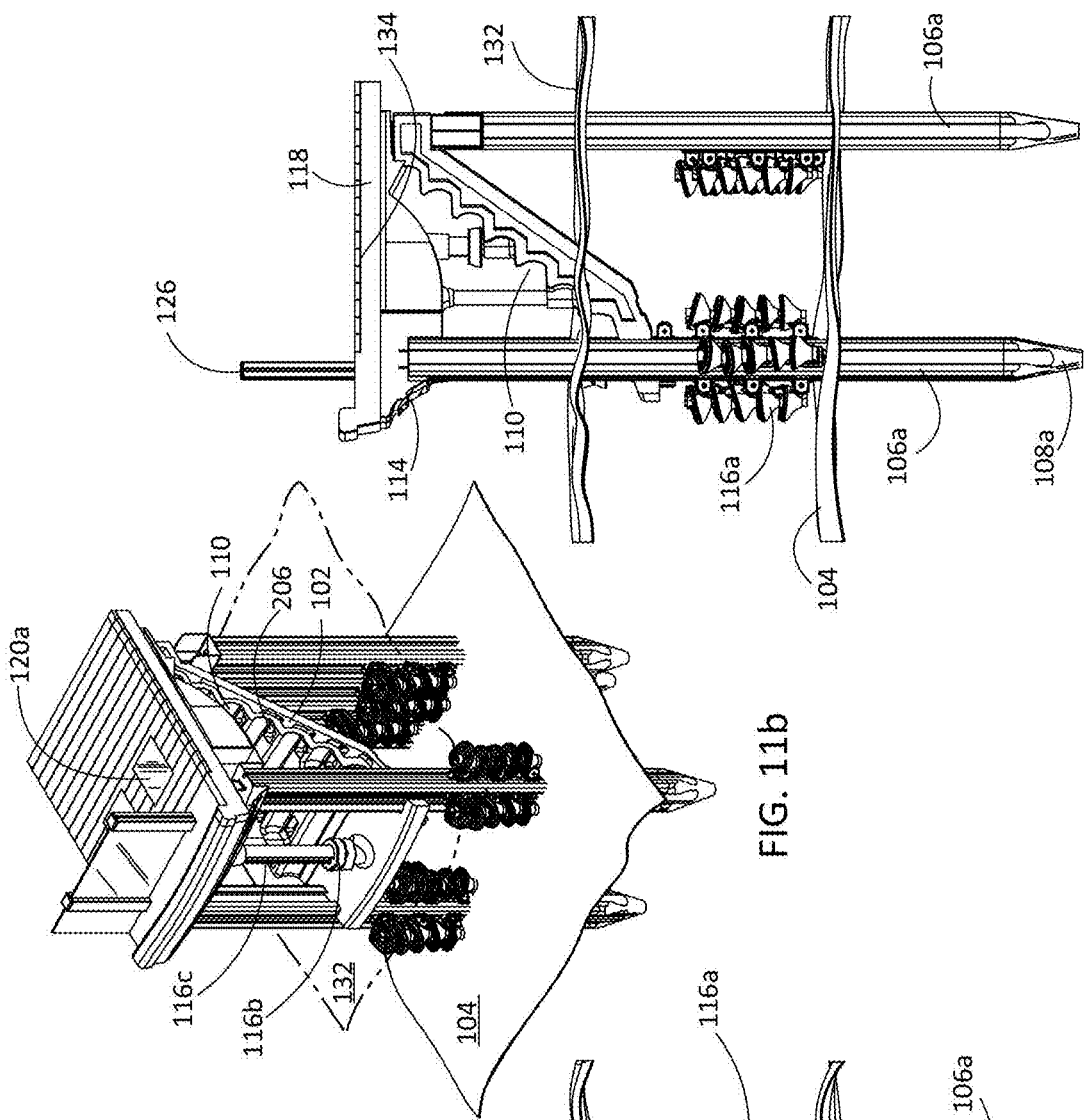
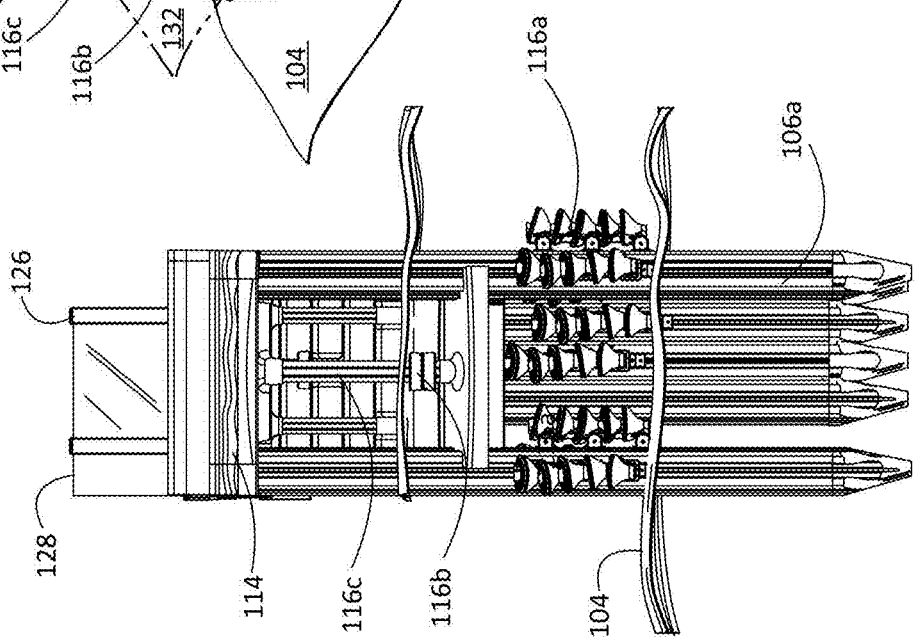
FIG. 11c
FIG. 11b
FIG. 11a

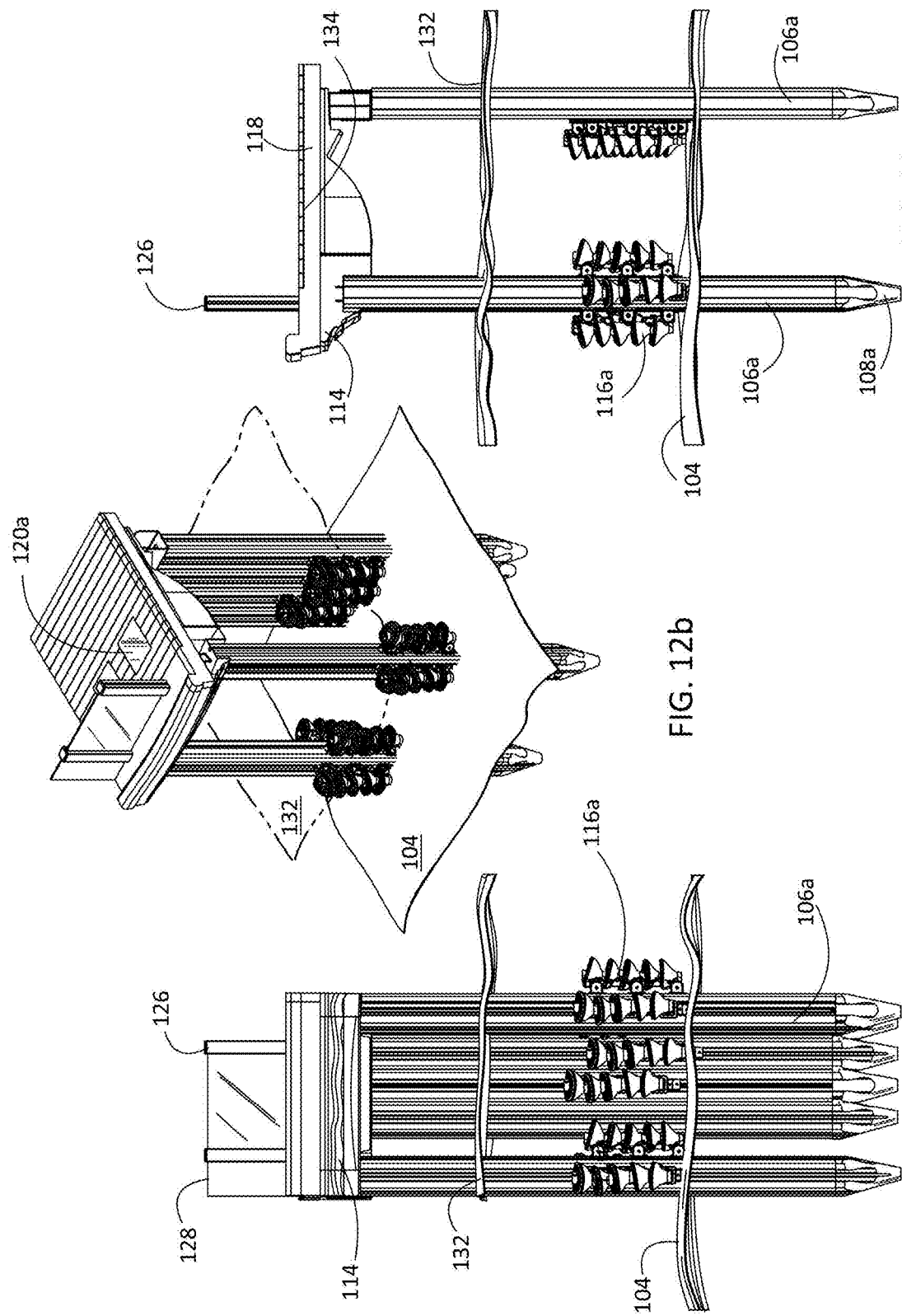

ial application Ser. No. 63/221,102 which was filed
INTERLOCKING MODULAR SMART SEAWALL DIVERSION AND RECREATION SYSTEM AND METHOD OF INSTALLATION

CROSS REFERENCE OF RELATED APPLICATIONS

This patent application claims the benefit of a U.S. provisional application Ser. No. 63/221,102 which was filed on Jul. 13, 2021. The above application is incorporated in its entirety by reference herein.

The applicant and inventor, Pepsy M. Kettavong's previous U.S. Pat. No. 11,072,900 filed on Oct. 14, 2020 is incorporated by reference herein in its entirety, as well as U.S. provisional application Ser. No. 62/924,381 filed Oct. 22, 2019, and U.S. patent application Ser. No. 16/940,230, filed Jul. 27, 2020 the full disclosure of both applications are incorporated by reference herein in its entirety.

FIELD OF THE INVENTION

The present disclosure relates to seawall wall system for a shoreline.

BACKGROUND

With the advent of climate change and increasing development along shorelines, shoreline erosion control has become an issue of great importance. Various systems have been developed to attempt to prevent erosion while maintaining an aesthetically appealing shorefront. Existing systems, however, have all been shown to have limitations and improved technology is needed to address the problem of shoreline erosion.

Conventional sea wall systems such as steel sheet pile walls, monolithic concrete barriers, rubble mound structures, revetments (brick, block & large boulder walls) and gabions (steel cage filled with rip rap) all suffer from the same intrinsic flaw, in that they all work against wave energy and do not take advantage of wave energy to prevent erosion. Conventional systems are not resilient and do not support the co-existence of quality of life and natural habitats.

Solid sheet pile or solid concrete break walls absorb 100% of wave energy, thereby weakening structural integrity of the sea wall and distributing the wave energy to surrounding shoreline, thereby causing damage. For example, a house twenty feet from sheet pile will shake upon wave impact. Further, dissipating wave energy will cause damage to the neighboring properties.

A steel cage fill with stones, a revetment (large stones with a break wall) and rubble mount structures generally absorb about 75-80% of wave energy when newly constructed. Over time, however, this percentage decreases substantially due to the force of wave energy moving the stones out toward the body of water, thus causing them to sink into the sea or lake bed, and thereby weakening the rubble structure.

SUMMARY

The present disclosure, relates generally to a modular interlocking seawall diversion system and recreation system and method of installation (Smart Seawall) is a holistic approach creates a prime living space for both marine life and humanity. More so, the system provides one or more step-shaped diverter sections assembled in a side-by-side arrangement along the shoreline; foundation piling that support the wall sections and terminate at sheared attachments that securely anchor into a substrate; a diverter block with openings and diverter paths that divert incoming waves towards overflow deflectors and their natural environment, or divert sand for depositing at a distal location; and a platform atop the diverter sections to provide: prime outdoor living space or a pathway for walking, recreation and driving, a lighted platform for recreational activities, transparent skylight portals for observing indigenous aquatic habitats in the water below, utilities express path (i.e. cable, Wi-Fi, water hydrant line, electricity outlets, and fiber optic cable lines).

The present disclosure has the ability to use individual parts as needed depending on the environment and site conditions and applications as intended. These features can be installed costal, inner costal, or on land. Interlocking indigenous aquatic habitat elements (ARS) are configured to grow sea grass, marine plants, oyster reefs, sanctuaries for marine life, and provide a food source for people. In addition, the face, planter 116a, of the indigenous aquatic habitat planter assembly 117 is a generally bowl shaped housing with a curved face that is configured to slope upwardly from about 35 degrees from the bottom of the bowl to the rim that absorbs and diverts wave energy outwardly toward the incoming wave. The usage of the foundation piling anchor system, utility integration components, and interlocking architectural elements allow for the creation of not only straight seawalls and retainer walls, but also allow for the creation of concave or convex walls both in water and in land applications.

The resilient design uses water-flow to its advantage through a unique void-opening and various diverter systems that redirect and absorb the flow of wave energy. The shape of the indigenous aquatic habitat (ARS) is also designed to divert and absorb incoming wave energy. A void pattern can be artist-designed and act as protection against floating debris (wooden logs, trash) and can also prevent fish from entering. A step diverter design slows down wave energy and redirects it back towards the lake in a controlled manner. A serviceable skylight portals and panels redirection incoming wave back to chamber. In addition, it provided lighting source for above and below the platform. The Smart Seawall absorbs and redirects the force of wave energy, thereby decreasing its impact to surrounding residents.

In addition, integrated ARS may not only absorb the under-wave current, it provides essential structural base elements and creates an environment for aquatic life. The Smart Seawall has been designed for managing coastal erosion and flooding, while also creating harmony for the living creatures at the shoreline. The system of the present disclosure increases quality of life for residents, while respecting and protecting the environment so that man-made systems and natural environments can co-exist. The Smart Seawall requires little maintenance and has the ability to adapt by adding another Smart Seawall deflector extension to meet higher water levels and various modular components as needed.

One objective of the present invention is to form a series of modular components that help prevent the erosion of a shoreline or in land structural retainer wall or architectural structural elements.

Yet another objective is to provide an inexpensive to manufacture and install an environmentally sustainable modular seawall diversion and recreation system.

Another objective is to install the system 100 using pre-cast mold, extruded or protrudes interlocking modules.

Another objective is to use composite materials resistant to weathering, for example fiberglass reinforced plastic (FRP), Polyvinyl Chloride (PVC) or High-Density Polyethylene (HDP) materials or resins.

Another objective is to reinforce the strength of the seawall with rebar guide inside the foundation pilings, rebars inside the overflow deflector, platform and diverters.

Yet another objective is to pour concrete through the interlinking voids to create a permanent seal and the components are formed in a manner that allows concrete to be poured after the assembly of the entire structure is in place.

An exemplary objective is to provide a scalable system that accommodates varying installation heights.

Additional objectives are to reduced labor, from both a quantity and a skill perspective.

Yet another objective is to take advantage of manufacturing capabilities at offsite and on site factories.

Yet another objective is to integrate varying facades based on aesthetic preferences.

Yet another objective is to improve long term wear characteristics due to reduced wave impact being absorbed.

BRIEF DESCRIPTION OF THE DRAWINGS

The invention will now be described, by way of example, with reference to the accompanying drawings, in which:

FIG. 4a illustrates how the indigenous aquatic habitat elements (ARS) absorbs and redirects wave energy, provides sanctuary for aquatic life, and growth of sustainable human food source (i.e., Seaweed, sea grass, oysters), in accordance with an embodiment of the present invention;

FIG. 6a illustrates a sectioned side view of an anchor system for the interlocking indigenous aquatic habitat elements (ARS) of the Interlocking Modular Smart Seawall Diversion And Recreation System And Method Of Installation (Smart Seawall), the section taken along line 6a-6a of FIG. 6c, in accordance with an embodiment of the present invention;

FIG. 6b illustrates a perspective view of an anchor system for the interlocking indigenous aquatic habitat elements (ARS), showing permanent and temporary floating decks for architecture structure for elements, in accordance with an embodiment of the present invention;

FIG. 6c illustrates a top view of an anchor system for interlocking indigenous aquatic habitat elements (ARS), in accordance with an embodiment of the present invention;

FIG. 6d illustrates an exploded view of an anchor system for the interlocking indigenous aquatic habitat elements (ARS), shown in FIG. 6b, in accordance with an embodiment of the present invention;

FIG. 9a illustrates a side view of the foundation piling interlocking with the interlocking indigenous aquatic habitat elements (ARS), in accordance with an embodiment of the present invention;

FIG. 9b illustrates a top view of the foundation piling interlocking with the interlocking indigenous aquatic habitat elements (ARS), in accordance with an embodiment of the present invention;

FIG. 9c illustrates a perspective view of the foundation piling interlocking with the interlocking indigenous aquatic habitat elements (ARS), in accordance with an embodiment of the present invention;

FIG. 10a illustrates a perspective view of a combination foundation piling interlocking system to create, concave, convex, straight and architecture structure applications, in accordance with an embodiment of the present invention;

FIG. 10b illustrates a front view of a combination foundation piling interlocking system, in accordance with an embodiment of the present invention;

FIG. 10c illustrates a sectional view of a combination foundation piling interlocking system, the section taken along line 10c-10c of FIG. 10b, in accordance with an embodiment of the present invention;

FIG. 11a illustrates a front view of one of the embodiment of the Interlocking Modular Smart Seawall Diversion And Recreation System And Method Of Installation (Smart Seawall) featuring the diverter section which absorbs and redirects destructive wave energy in accordance with an embodiment of the present invention;

FIG. 11b illustrates a perspective view of one of the embodiment of the Interlocking Modular Smart Seawall Diversion And Recreation System And Method Of Installation (Smart Seawall) featuring the diverter section which absorbs and redirects destructive wave energy in accordance with an embodiment of the present invention;

FIG. 11c illustrates a side view of one of the embodiment of the Interlocking Modular Smart Seawall Diversion And Recreation System And Method Of Installation (Smart Seawall) featuring the diverter section which absorbs and redirects destructive wave energy in accordance with an embodiment of the present invention;

FIG. 12a illustrates a front view of one of the embodiment of the Interlocking Modular Smart Seawall Diversion And Recreation System And Method Of Installation (Smart Seawall) without the diverter section in accordance with an embodiment of the present invention;

FIG. 12b illustrates a perspective view of one of the embodiment of the Interlocking Modular Smart Seawall Diversion And Recreation System And Method Of Installation (Smart Seawall) without the diverter section in accordance with an embodiment of the present invention;

FIG. 12c illustrates a side view of one of the embodiment of the Interlocking Modular Smart Seawall Diversion And Recreation System And Method Of Installation (Smart Seawall) without the diverter section in accordance with an embodiment of the present invention;

Like reference numerals refer to like part throughout the various view of the drawings.

DETAILED DESCRIPTION OF THE INVENTION

Figure 1:
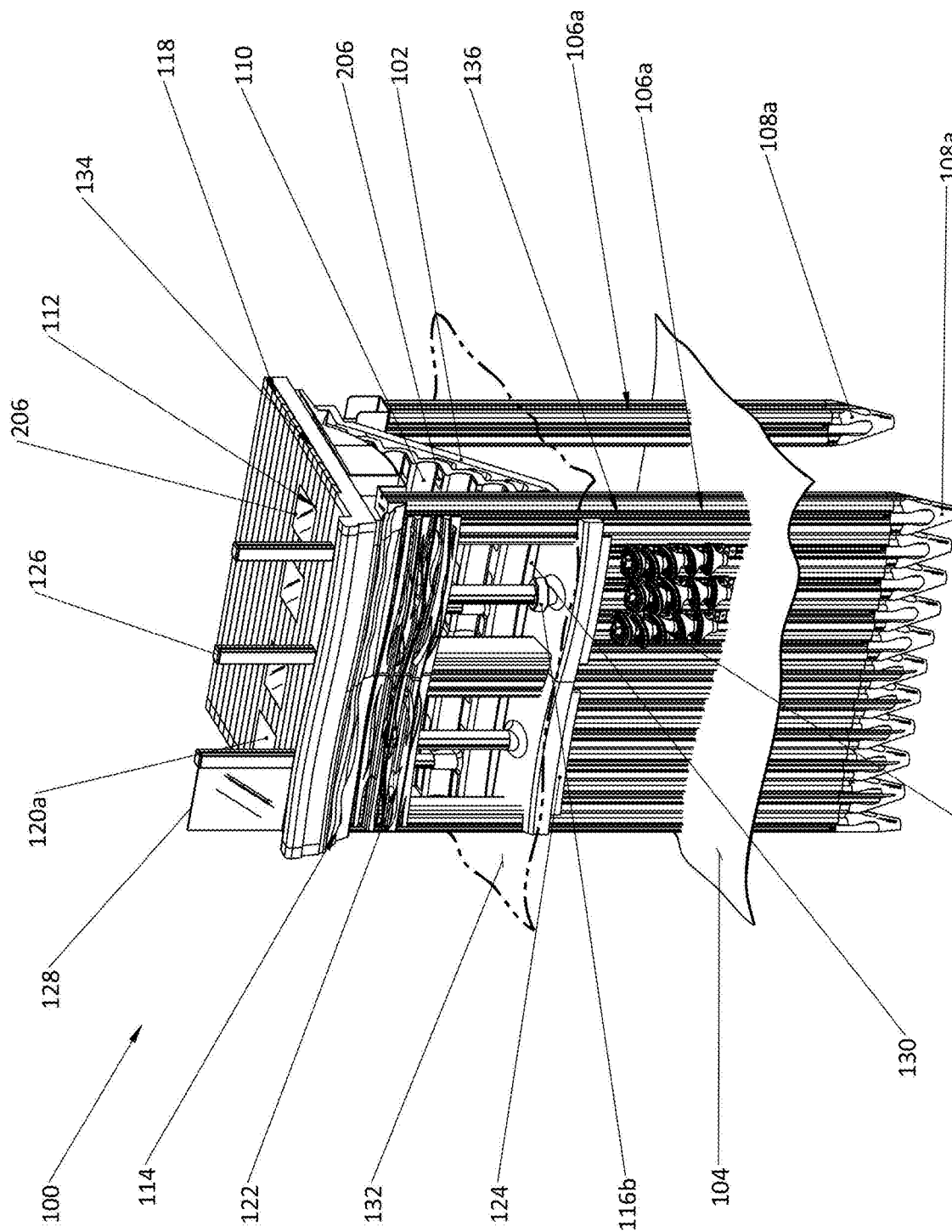
FIG. 1 illustrates a perspective view of an exemplary Interlocking Modular Smart Seawall Diversion And Recreation System And Method Of Installation (Smart Seawall)

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

This disclosure relates generally to an interlocking modular smart seawall diversion and recreation system, the system comprising: one or more diverter sections arranged in a side-by-side configuration, the diverter sections defining a rear face and an opposing front face that orients towards incoming waves, the diverter sections further defining a base end oriented towards a ground surface and an opposing upper end, the diverter sections being configured to slope upwardly from the base end to the upper end; the diverter sections comprising multiple steps consisting of a curved riser and a tread, multiple foundation pilings configured to support the diverter sections, the foundation pilings defining an interior cavity, a top end engaging the diverter sections, and a bottom end engaging the ground, the foundation pilings having one or more longitudinal grooves configured to enable flowage of a porous material that encourages aquatic growth from the top end to the bottom end, the one or more longitudinal grooves of the foundation pilings are configured to removably engage with at least one indigenous aquatic element; a rebar guide disposed inside the cavity of the foundation pilings, the rebar guide traversing across the cross section of the foundation pilings; a diversion block joined with the top end of the foundation pilings, the diversion block defining a diversion path configured to enable passage of the waves that reach the upper end of the diverter sections, the diversion path further being configured to recirculate back to a diverter chamber, the diversion block further defining multiple cement holes aligned with the top end of the foundation pilings, the cement holes enabling passage of cement or filler into the cavity of the foundation pilings, the diversion block further defining multiple piling coupling protrusions configured to couple with the top end of the foundation pilings; a skylight portal configured to be removable from the diversion block for removing debris and aquatic wildlife, the skylight portal further being configured to support an LED strip or electric components and provide light source for an indigenous aquatic habitat elements; a platform joined with the upper end of the diverter sections in a perpendicular relationship, whereby the platform is horizontal, the platform defining a bottom surface oriented towards the ground and an opposing top surface, the platform defining multiple apertures, at least one of the apertures being in fluid communication with the diversion path; and an interlocking support structure attached to the platform and the diverter sections that supports at least one indigenous aquatic habitat element.

In one embodiment of the present invention, an interlocking modular seawall diversion and recreation system 100, hereafter "system 100" creates a unique seawall adapted for multiple purposes, including: diverting incoming waves, supporting aquatic wildlife, and providing a recreational site. An interlocking modular smart seawall diversion and recreation system provides step-shaped diverter sections arranged side-by-side along a shoreline. The diverter sections slope from a base end up towards an upper end. To break kinetic energy of waves, and divert waves, the diverter sections form steps with curved risers and horizontal treads. The system forms a diversion path for the waves that reach the upper end of the modular walls and recirculate the wave energy back to divertor chamber and natural environment. Foundation pilings project into the ground and extend up to support the wall sections. The bottom end of foundation pilings terminates at sheared attachments having a tapered cross section and an edge for securely anchoring into the ground. A platform atop the diverter sections provides a pathway; a lighted platform for recreational activities; and transparent skylight portals for observing aquatic wildlife in water below and creating an indigenous ecosystem.

Within the foundation piling groove the interlocking modular and structural anchor system is designed for structures connection solutions for permanent and temporary locking systems. In addition, the slight curve of the foundation piling interlocking system will allow the creation of a concave, convex, straight seawall foundation pilings or modularly interlocking to form a 90 degree angle formations. Additionally, the shear attachment will have approximately 2 to 6 inches openings in the middle to allow high water pressure approximately 10,000 to 40,000 psi jet/hydro jet systems. The system will blast dense substrate such as limestone, sand, rocks, and other hindering material. The blast process will break apart obstructive materials and debris creating pathway to drive, vibrate or hydraulic pressure foundation piling into the substrate of the ocean and other bodies of water. These interlocking modular smart seawall diversion and recreation system (Smart Seawall) pieces are installed as a comprehensive group or individually depending on the site/environmental situation, (calm or rough water, inner or outer costal) and the functionality of intent usage. Also, the Smart Seawall can be used inland structural application.

It is significant to note that the system 100 is fabricated from a composite material that creates a lightweight, more easily transportable (Smart Seawall). The composite material is also more effective for supporting aquatic wildlife. In other embodiments, the composite material may include, without limitation, a corrosion resistant polymer, a fiberglass reinforced plastic (FRP), a Polyvinyl Chloride (PVC), a High-Density Polyethylene (HDP), and any plastic material having sufficient strength.

FIG. 1 illustrates a perspective view of an exemplary Interlocking Modular Smart Seawall Diversion and Recreation System and Method Of Installation (Smart Seawall). As FIG. 1 illustrates, system 100 includes one or more step-shaped diverter sections 102*a* and 102*b*, which form the primary bulk and dimensions for breaking and diverting the incoming waves. Diverter sections 102*a* and 102*b* may be arranged in a side-by-side configuration along a shoreline. Any number of diverter sections 102*a* and 102*b* may be used to create sufficient protection against incoming waves. Diverter sections 102*a* and 102*b* are configured to slope from a base end 502*b* oriented towards the ground of the shoreline, to an upper end 502*a* that orients away from the ground surface 104.

Figure 3:
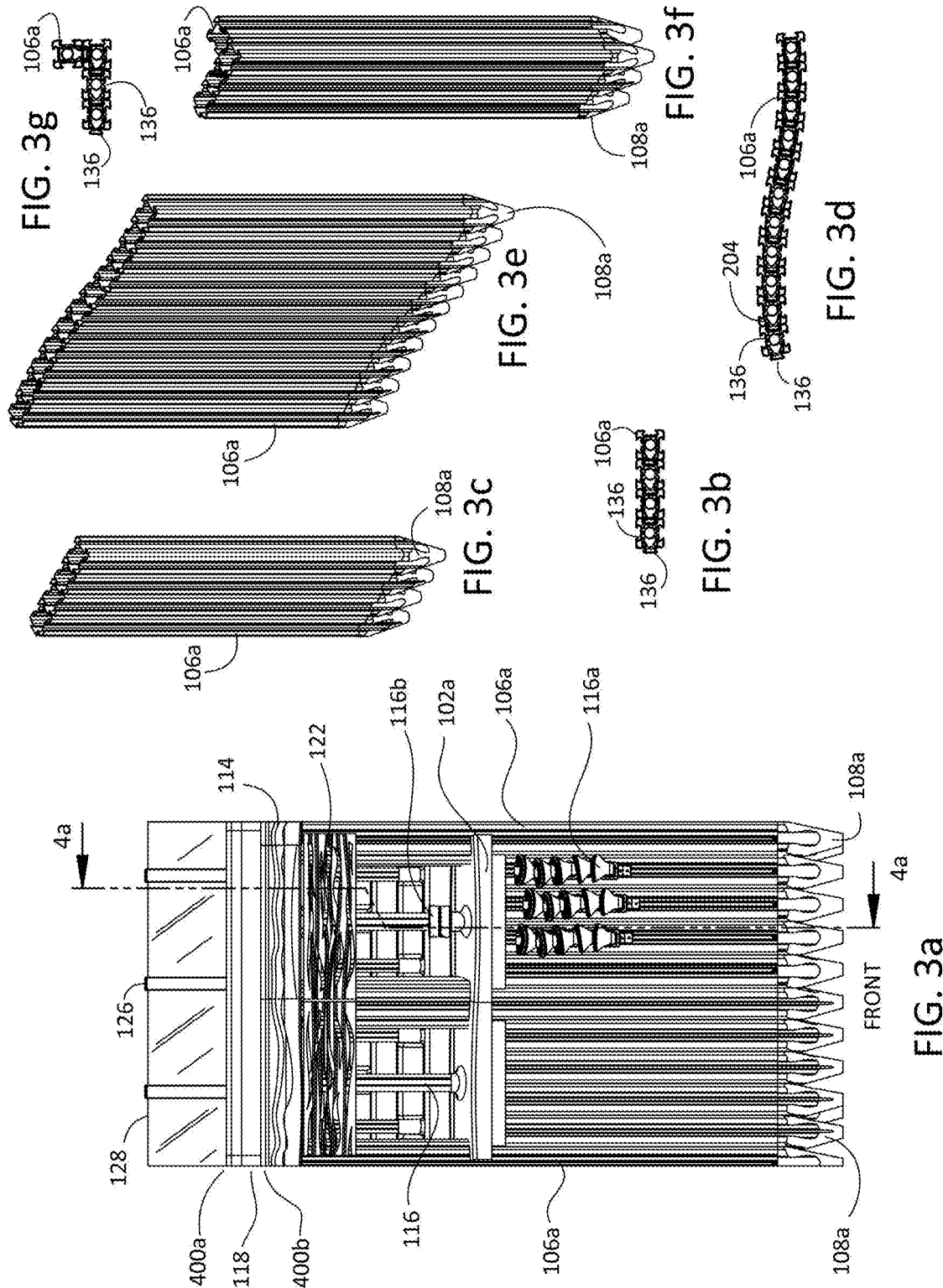
FIG. 3a illustrates a front view of the Interlocking Modular Smart Seawall Diversion And Recreation System And Method Of Installation (Smart Seawall) shown in FIG. 1, in accordance with an embodiment of the present invention.
FIG. 3b illustrates a top view of multiple foundation pilings, in accordance with an embodiment of the present invention.
FIG. 3c illustrates a perspective view of multiple foundation pilings, in accordance with an embodiment of the present invention.
FIG. 3d illustrates a top view of multiple foundation pilings, in accordance with an embodiment of the present invention.
FIG. 3e illustrates a perspective view of multiple foundation pilings, in accordance with an embodiment of the present invention.
FIG. 3f illustrates a perspective view of the foundation pilings modularly interlocking to form a 90 degree angle, in accordance with an embodiment of the present invention.
FIG. 3g illustrates a top view of the foundation pilings modularly interlocking to form a 90 degree angle, in accordance with an embodiment of the present invention.

In one possible embodiment, system 100 may also utilize one or more architectural members 126 across top surface 400*a* of the platform 118, which provide both aesthetic and functional uses. The architectural members 126 are joined with the top surface 400*a* of the platform 118. In some embodiments, the architectural members 126 may include, without limitation, a fence post, a column, a roof, and an electrical outlet. In one possible embodiment, the system 100 may include multiple transparent fence panels 128 arranged along spaced apart fence posts, which are one type of architectural members 126 (See FIG. 3).

Another example of an architectural member is a roof that covers a picnic bench and table. Yet another example is a recreational accessory anchor, which can be used to restrain chairs, benches, umbrellas and the like. This can be useful for anchoring items in a bad storm, or overnight. Yet another example is plantings, such as trees, bushes, flowers, gardens, and the like. This can include a drainage hole that carries excess water down into the diversion sections and aquatic wildlife below.

At its core, system 100 provides a modular structure and process of installation that forms a seawall along a shoreline. The unique features enable use along a greater number of shorelines, improved aesthetic integration, and an eco-friendly base. The diverter sections can be assembled in many ways to accommodate site requirements and purchaser preferences, at the same time being less costly to install and more effective than traditional seawall designs. Furthermore, the system allows future integration to the upcoming generations with minimal adaptations.

Such modularity offers park light settings with custom design furniture, interlocking platforms of grass, (real or synthetic), railings, wide, spacious stairwells to water, handicap access and custom lighting (including outlets). In addition to the expanded outdoor real estate, the system creates an underwater indigenous sea life, visible through the clear, removable panels on the decking, designed for clean out and viewing window into the underwater ecosystem. In alternative embodiments, the system can be configured to enable kinetic conversion to hydropower, whereby the waves are diverted to a turbine and generator for generating electricity.

Those skilled in the art will recognize that traditional seawall solutions are designed to work against nature. Each has their own advantages, but also carry significant flaws. Hard surface seawalls such as sheet pile and concrete seawalls oppose 100% of the wave force.

Absorbing 0% of the wave force often exceeds the capability of the seawall creating damage to the properties they are built to protect. In addition, the increased force from each wave drastically increases the erosion and wear rates for the components of the system, requiring more regular re-work to maintain function and aesthetics.

It is also recognized that absorbing 0% of the wave force also causes the surrounding homes to shake upon wave impact, a disruption for human and aquatic residents alike. Revetment (armor stone) becomes unstable over time, settling and shifting every season; thus, its effectiveness diminishes beginning the day it is installed. Gabion cages made with riprap and medium-sized stone suffer the same fate as revetment and pose safety and pollution risks as the cages deteriorate over time. As time progresses, shifting rocks leave a large void exposing the underside of the concrete to the elements, ultimately leading to its destruction. All systems fail to provide long-term protection in rough water 132 environments.

It is also recognized that multiple challenges exist for the existing seawall/seawall technology, ranging from aesthetic to performance. The limited number of existing seawall/seawall solutions means the same solution is used across a range of installation conditions. True site customization for an aesthetically pleasing and highly effective seawall system is only available for extremely cost-unconscious clients.

From an aesthetic perspective, owners are not able to choose a finish or style of their system. This is highly desirable, particularly as waterfront properties are typically higher value areas where the aesthetic nature of the property is actively maintained and a concern for clients. The limited number of technical options means that the form factor for the seawall lacks design elegance; metaphorically speaking when you only have a hammer that's the only tool you use. The limited number of approved, certified, and effective seawall systems means there are limited to no customization options available for a property owner. The same design form factor is forced into properties with a range of changing conditions like elevation variation, natural surround type, and functionality like docking, steps or lighting.

Figure 2:
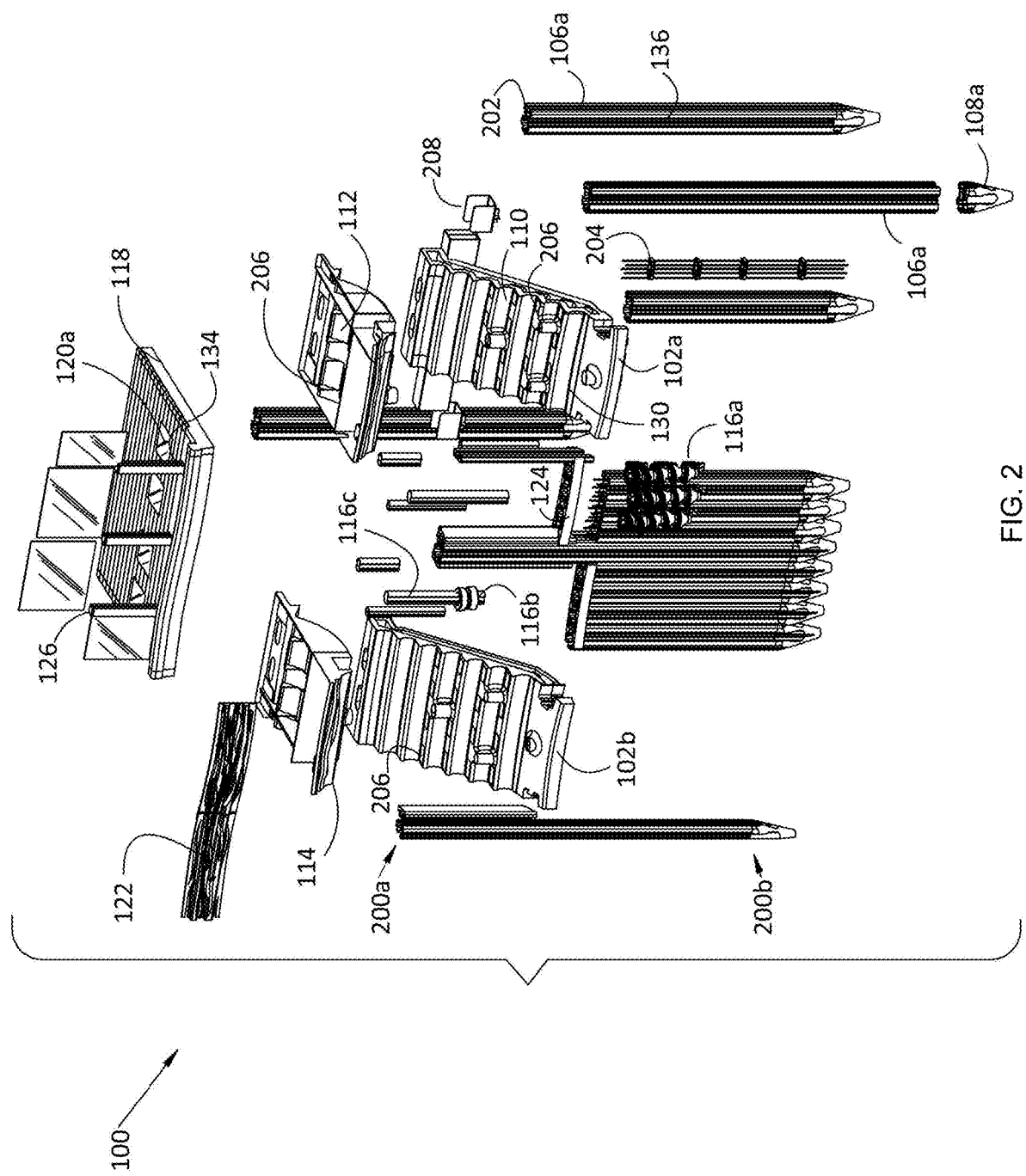
FIG. 2 illustrates an exploded view of the Interlocking Modular Smart Seawall Diversion And Recreation System And Method Of Installation (Smart Seawall) shown in FIG. 1, in accordance with an embodiment of the present invention.

FIG. 2 illustrates an exploded view of the Interlocking Modular Smart Seawall Diversion and Recreation System And Method Of Installation (Smart Seawall) shown in FIG. 1, in accordance with an embodiment of the present invention. In some embodiments, system 100 provides a diversion block 110 that rests on the top end 200a of the foundation pilings 106a and 106n. The diversion block 110 define a diversion path 112 that is configured to enable passage of the waves that reach the upper end 502a of the diverter sections 102a and 102b. In some embodiments, diversion path 112 may include a channel or opening that enables passage of the water 132 towards the overflow deflectors 114 and/or the wave's natural environment. Diversion path 112 is also recirculate back into the diversion chamber (see FIG. 3) diversion 112, which attaches to the upper end 502a of the diverter sections 102. The overflow deflectors 114 is configured to redirect water 132 that has exceeded the bounds of the upper end 502a of the diverter sections 102a and 102b.

The structure of the foundation pilings 106a is as follows: defining an interior cavity, having a top end 200a engaging the diverter sections 102a and 102b, and having a bottom end 200b engaging the ground surface 104. The foundation pilings 106a and 106a are generally elongated and cylindrical. However, the foundation pilings 106a and 106a form longitudinal grooves, and geometric surface shapes that help in interconnections, pouring fluids along the outer surface, and pouring cement into the interior cavity. The architectural structural frame's connections/braces design for permanent and floating docks, or any other architectural structural applications. The slight curve design of the foundation piling gives the installer the unique ability to create a concave, convex, or straight seawall by alternating the orientation of the foundation piling's directional groove guide.

In some embodiments, foundation pilings 106a and 106a define an outer wall that forms multiple longitudinal grooves 136, extending along the entire length of the pilings 106a and 106a. The longitudinal grooves 136 are configured to enable flowage of a porous material that encourages aquatic growth from the top end 200a to the bottom end 200b. The porous material has sufficient viscosity to easily flow through the longitudinal grooves, and through the water. This enhances the health and quantity of aquatic wildlife living on and around the foundation pilings.

Further, an aquatic base seal 124 is configured to cover the top end 200a of the foundation pilings 106a and 106n. Sheared attachment 108a and 108n and the aquatic base seal 124 serve as caps to their respective ends. This prevents and debris from entering into the cavity of the foundation piling from both the bottom and top end 200 as of the foundation piling. The end goal is the foundation piling driven into the bed that is mostly empty of debris, leaving a space for concrete to be poured.

To support the diverter sections 102a and 102b, the system 100 may also utilize multiple foundation pilings 106a and 106n that project into the ground of the shoreline. Foundation pilings 106a and 106n terminate at a sheared attachment 108a and 108n having a tapered cross section and a sharp edge that is efficacious for driving and securely anchoring into the ground. Sheared attachment 108a and 108n also caps the hollow foundation piling from the bottom end 200b, so that sand and residue does not enter therein. This restriction of sand and residue can be useful for determining the amount of cement to be poured into the foundation piling. Similarly, an aquatic base seal 124 caps the foundation piling from the top end 200a. Once driven into the ground, foundation pilings 106a and 106n can be filled with cement to make the structure more stable.

FIG. 3a illustrates a front view and the flexibility installation for Foundation Piling to modularly interlocking to create concave, convex and straight formations of the Interlocking Modular Smart Seawall Diversion And Recreation System And Method Of Installation (Smart Seawall) shown in FIG. 1, in accordance with an embodiment of the present invention. The foundation pilings 106a and 106a are initially hollow, so as to form an interior cavity, until filled with cement, as described below. Suitable composite materials for foundation pilings 106a and 106a may include, without limitation, a corrosion resistant polymer, a fiberglass reinforced plastic (FRP), a polyvinyl chloride (PVC), and a high-density polyethylene (HDP). In some embodiments, a rebar guide 204 rests the cavity in the foundation pilings 106a and 106a. In alternative embodiments, multiple rebar guides 204 are positioned to traverses across the cross section of the foundation pilings 106a and 106a. In this manner, rebar guide 204 helps stabilize the foundation pilings 106a and 106a has cement is being poured into the cavity.

FIG. 3b illustrates a top view of the foundation pilings modularly interlocking in a straight-line formation, in accordance with an embodiment of the present invention. The foundation pilings 106a have longitudinal grooves 136 which allow for the foundation pilings 106a to modularly interlock with one another. In order to from a straight-line formation, the foundation pilings 106a are installed by alternating the orientation of the foundation piling's longitudinal grooves 136.

FIG. 3c illustrates a perspective view of the foundation modularly pilings interlocking in a straight-line formation, in accordance with an embodiment of the present invention. The foundation shear attachment 108a attaches to 106a and then are adhered together.

FIG. 3d illustrates a top view of the foundation pilings modularly interlocking in a concave and convex formation, in accordance with an embodiment of the present invention. A rebar guide 204 rests within the cavity in the foundation pilings 106*a*. The foundation pilings 106*a* have longitudinal grooves 136 which allow for the foundation pilings 106*a* to modularly interlock with one another.

FIG. 3*e* illustrates a perspective view of the foundation pilings modularly interlocking in a concave and convex formation, in accordance with an embodiment of the present invention. The foundation shear attachment 108*a* attaches to 106*a* and then are adhered together.

FIG. 3*f* illustrates a perspective view of the foundation pilings modularly interlocking to form a 90 degree angle, in accordance with an embodiment of the present invention.

FIG. 3*g* illustrates a top view of the foundation pilings modularly interlocking to form a 90 degree angle, in accordance with an embodiment of the present invention. The foundation pilings 106*a* have longitudinal grooves 136 which allow for the foundation pilings 106*a* to modularly interlock with one another.

Figure 4:
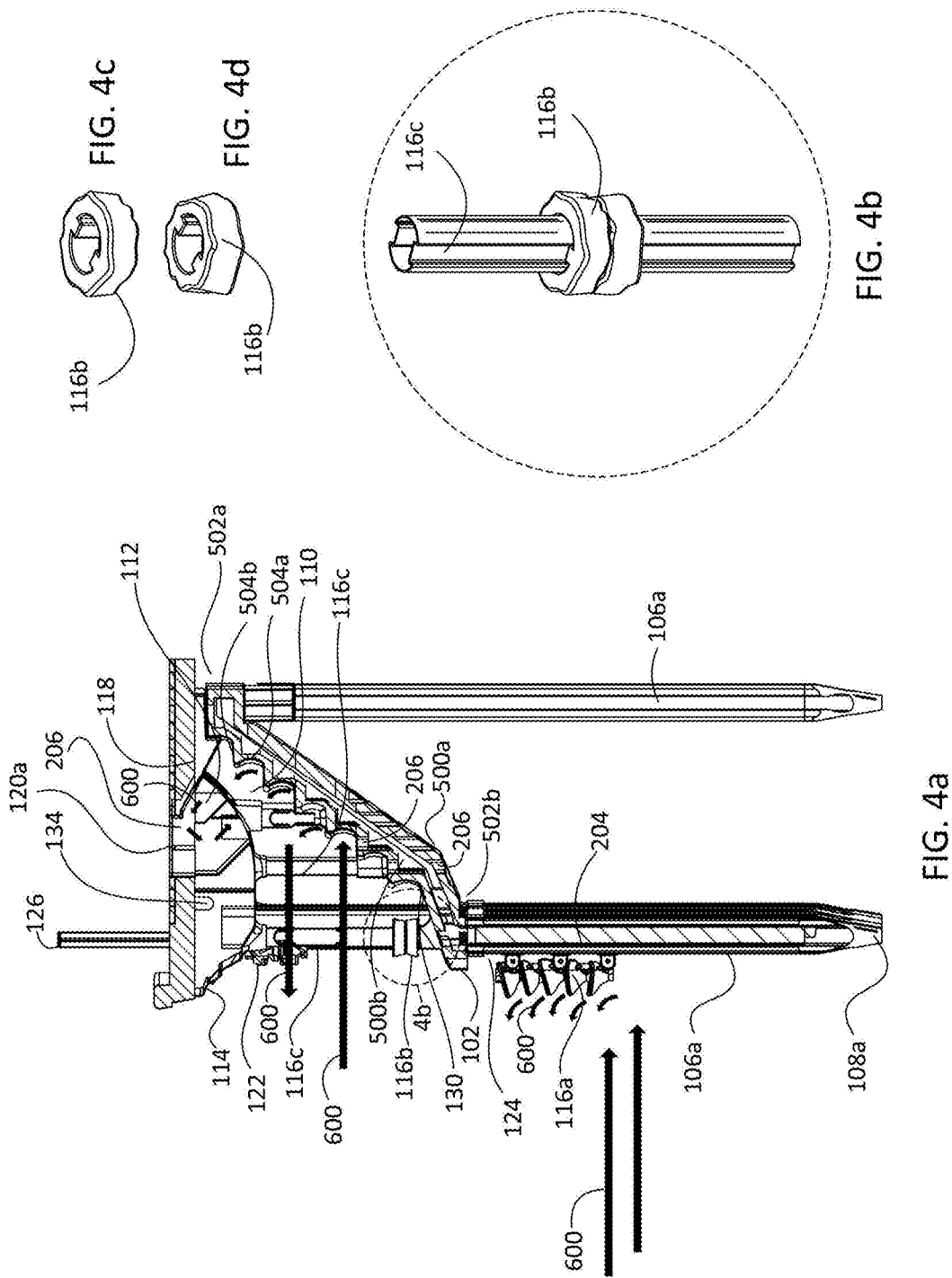
FIG. 4a illustrates a sectioned side view of the Interlocking Modular Smart Seawall Diversion And Recreation System And Method Of Installation (Smart Seawall), the section taken along line 4a-4a of FIG. 3a, showing the wall sections, the diverter sections, and the platform of the system, in accordance with an embodiment of the present invention; In addition
FIG. 4b illustrates a portion of a view of the indigenous aquatic habitat element (ARS) as shown in FIG. 4a enlarged for magnification purposes, in accordance with an embodiment of the present invention.
FIG. 4c illustrates a top view of the interlocking indigenous aquatic habitat elements (ARS), in accordance with an embodiment of the present invention.
FIG. 4d illustrates a bottom view of the interlocking indigenous aquatic habitat elements (ARS), in accordance with an embodiment of the present invention.

FIG. 4*a* illustrates a sectioned side view of the Interlocking Modular Smart Seawall Diversion and Recreation System (Smart Seawall), the section taken along line 4*a*-4*a* of FIG. 3*a*, in accordance with an embodiment of the present invention. To help break the kinetic energy of the waves, and divert the waves back to the natural environment, diverter sections 102*a* and 102*b* include multiple steps consisting of a curved riser 504*a* and a tread 504*b*. It is significant to note that the curved, or hyperbolic shape of the riser 504*a* helps break the kinetic energy of the wave. Furthermore, the diverter sections 102*a* and 102*b* are configured to absorb and divert incoming waves towards overflow deflectors 114 and the wave's natural environment. The step-shaped configuration from the curved riser and tread is efficacious for breaking the kinetic energy of the incoming waves. Further, the sloped disposition of diverter sections 102*a* and 102*b* forces the waves to climb against gravity and friction, which further decreases the kinetic energy thereof.

In some embodiments, diverter sections 102*a* and 102*b* have a front face 500*b* that orients towards incoming waves, receiving the full impact thereof; and a rear face 500*a* that orients away from the incoming waves. A filling material is filled between the rear face of the diverter sections and the shoreline for enhancing structural integrity. The filler material can include rocks, cements, sand, and any filling material known in the art of seawall. In some embodiments, the diverter sections 102 are configured to slope upwardly from about 30°-75° from the base end 502*b* to the upper end 502*a*. However, the degree of the slope is determined based on the type of shoreline, and the intensity of the waves. Those skilled in the art will recognize that such slopes force the waves to climb against gravity and friction, which further decreases the kinetic energy of incoming waves. The length from the base end 502*b* to the upper end 502*a* may be varied to accommodate different shorelines and wave parameters. It is significant to note that the system 100 is scalable, such that different shapes and dimensions of the diverter sections 102*a* and 102*b* may be used.

In addition, the face of the indigenous aquatic habitat planter assembly, the planter 116*a*, is a generally bowl shaped housing with a curved face that is configured to slope upwardly from about 35 degrees from the bottom of the bowl to the rim that absorbs and diverts wave energy outwardly toward the incoming wave. 35 degrees is the preferred embodiment but can be positioned to range between 10 and 75 degrees.

In some possible embodiments, system 100 includes multiple flow panels 122 that are arranged in an interlocking, side-by-side relationship. Flow panels 122 may be connected to the longitudinal grooves along the foundation pilings 106*a* and 106*a*. Flow panels 122 comprise an ornamental configuration and multiple openings configured to enable passage of water 132 and restrict passage of debris. In alternative embodiments, flow panels 122 comprise laser cut opening in sheet pile. In alternative embodiments, the flow panel has wavy openings that depict a blue whale. However, any type of aquatic related cutout could also be used. In any case, the openings provide a passageway for water 132 to egress from the diverter sections 102*a* and 102*b*.

In alternative embodiments, system 100 includes an aquatic habitat element 116. Aquatic habitat element 116 is disposed at or near the diverter sections 102*a* and 102*b*. Aquatic habitat element 116 is configured to form a habitat for indigenous aquatic wildlife. In some embodiments, aquatic habitat element 116 comprises a column or an irregular surface. In other embodiments, aquatic habitat element 116 is cast out of materials i.e., concrete or other materials that will allow marine life to grow. This cast is configured to slide into the precast interlocking structure.

In some possible embodiments, an indigenous ecosystem base 130 supports the aquatic habitat element 116. Ecosystem base 130 allows aquatic wildlife to grow; aiding in the increased aquatic life population. It is significant to note that the natural environment for shoreline habitat is destroyed in other designs. This design supports aquatic life by open access to natural water 132 flow to mimic the natural environment it replaced.

FIG. 4*b* illustrates a portion of a view of the modularly interlocking indigenous aquatic habitat shelf assembly 116*b* and interlocking support structure 116*c* as shown in FIG. 4*a* enlarged for magnification purposes, in accordance with an embodiment of the present invention. The indigenous aquatic habitat shelf assembly 116*b* is configured to grow sea grass, marine plants, oyster reefs, sanctuaries for marine life, and provide a food source for people. In addition, 116*c* can be filled with cement to provide structural support to the present invention.

FIG. 4*c* illustrates a top view of the interlocking indigenous aquatic habitat shelf assembly 116*b* in accordance with an embodiment of the present invention.

Figure 5:
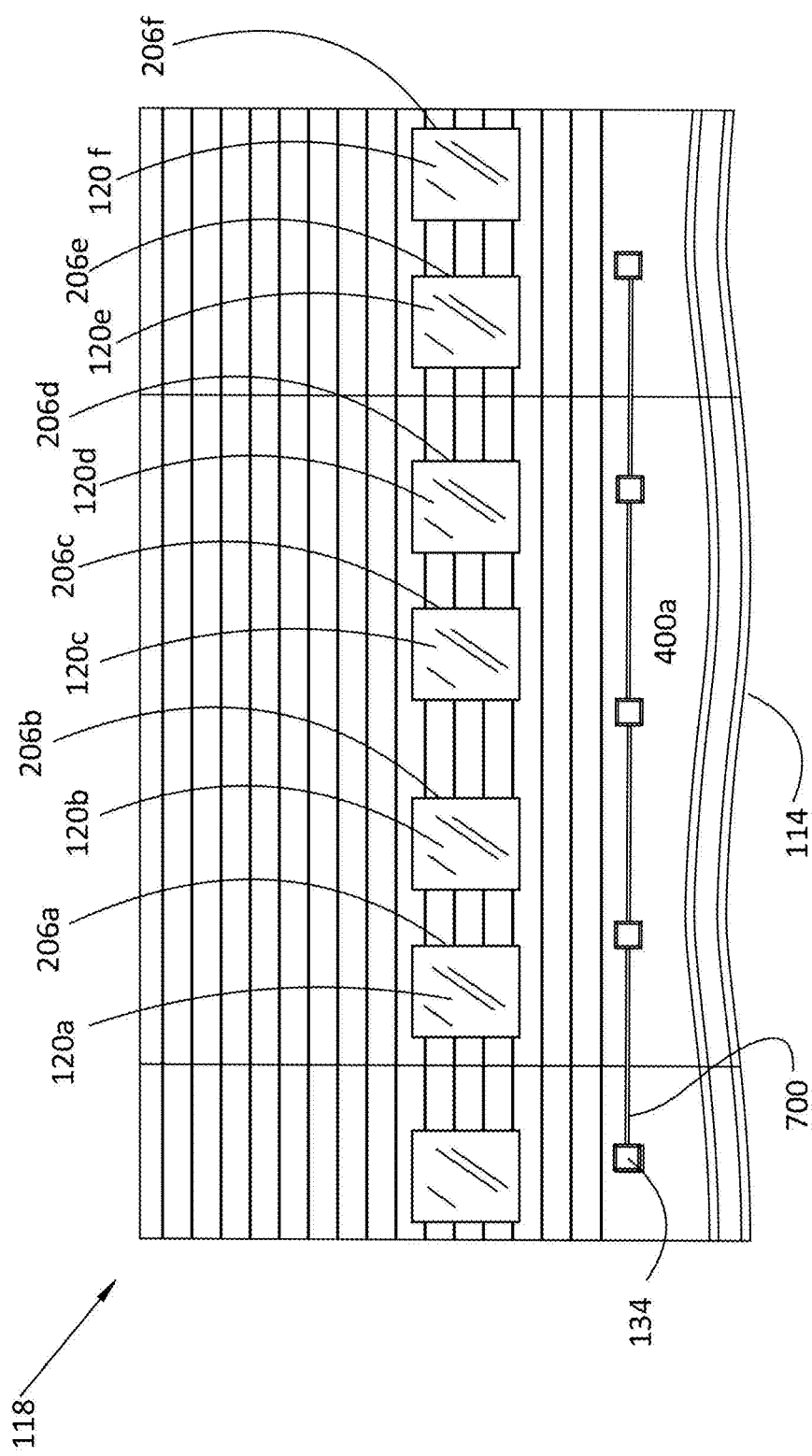
FIG. 5 illustrates a top view of an exemplary platform, in accordance with an embodiment of the present invention.

FIG. 4*d* illustrates a bottom view of the interlocking indigenous aquatic habitat shelf assembly 116*b* in accordance with an embodiment of the present invention;

FIG. 5 illustrates a top view of an exemplary platform, in accordance with an embodiment of the present invention. System 100 comprises a platform 118 that rests on the upper end 502*a* of the diverter sections 102, in a generally perpendicular relationship. Whereby the platform 118 is horizontal, the platform 118 defining a bottom surface 400*b* oriented towards the ground and an opposing top surface 400*a*, the platform 118 defining multiple apertures, at least one of the apertures being in fluid communication with the diversion path 112. Suitable materials for the platform 118 may include, without limitation, a corrosion resistant polymer, a fiberglass reinforced plastic (FRP), a polyvinyl chloride (PVC), and a high-density polyethylene (HDP) In some embodiments, a skylight portal 206 is configured to be removable from the diversion block 110. The detachable configuration of the skylight portal enables removing debris and aquatic wildlife that can clog the diversion block. In other embodiments, the skylight portal 206 is configured to support an LED strip 700. This creates an aesthetic effect on top of the platform.

In other embodiments, system 100 may include an at least partially transparent panel 120a-f covering at least one of the apertures. In this manner, the aquatic habitat element 116 and the indigenous aquatic wildlife are viewable from the top surface 400a of the platform 118. In one non-limiting embodiment, the at least partially transparent panel 120a-f comprises a skylight portal. In one non-limiting embodiment, the transparent panel 120a-f is a watertight panel with interlocking deck board for integrating a deck board, or grass.

As shown in FIG. 1, integrated electric utilities 134, which are integrated inside the cavity of the platform 118, may include grooves, slides, and holes that allow electric wire and other circuitry to slide through for electrical operation. The degraded electric utilities are cast in place electric light and plug integration into the deflector and PRAP. One possible embodiment, LED strips 700 are supported around the transparent panel 120a-f, and across the top surface 400a of the platform 118. The integrated electric utilities 134, which are integrated inside the cavity of the platform 118, create an aesthetic environment, especially at night, and while viewing the aquatic wildlife through the transparent panel 120a-f. The electric utilities 134 can comprise any type of utility such as cable, water hydrant, Wi-Fi, fiber optic cable and internet.

FIG. 6a illustrates a sectioned side view of an anchor system for the interlocking indigenous aquatic habitat planter assembly 117 of the Interlocking Modular Smart Seawall Diversion and Recreation System (Smart Seawall), the section taken along line 6a-6a of FIG. 6c, in accordance with an embodiment of the present invention.

FIG. 6b illustrates a perspective view of the interlocking indigenous aquatic habitat planter assembly 117 anchor showing permanent and temporary floating decks for architecture structure for elements, in accordance with an embodiment of the present invention. The longitudinal grove 136 acts as multifaceted anchor structure that allows for the indigenous aquatic habitat planter assembly 117, the fastening anchor 116e, and the locking wedge 116f to be attached as well as architectural anchor structures and support beams.

FIG. 6c illustrates a top view of an anchor system for interlocking indigenous aquatic habitat planter system 117 anchored to the foundation piling 106a, in accordance with an embodiment of the present invention.

FIG. 6d illustrates an exploded view of an anchor system for the interlocking indigenous aquatic habitat elements (ARS), shown in FIG. 6b, in accordance with an embodiment of the present invention. The planter 116a has a fastening anchor 116e that removably engages with the one or more longitudinal grooves 136 of the foundation pilings 106a and a locking wedge 116f and the planter 116a comprising a generally bowl shaped housing with a bottom, a rim and a curved face that is configured to slope upwardly from about 35 degrees from the bottom of the bowl to the rim that absorbs and diverts wave energy outwardly toward the incoming wave.

The fastening anchor 116e slides into the longitudinal groove 136 within the foundation piling 106a. The extension structure 116d slides into the fastening anchor 116e and the anchor lock pin 116g connects both pieces. Once extension structure 116d, fastening anchor 116e and anchor lock pin 116g are in place, 116f is used to secure a multiplicity of planters 116a to the foundation piling 106a. The planter core structure 116i is fitted into the extension structure 116d. Planter 116a is removably fitted onto the planter core structure 116i which is pinned together by planter lock pin 116h.

Figure 7D:
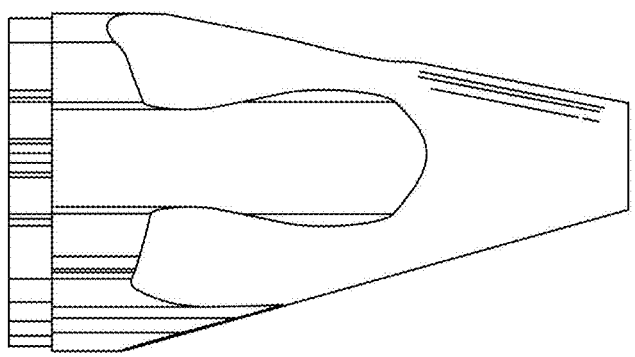
FIG. 7d illustrates a side view of a foundation shear attachment, in accordance with an embodiment of the present invention.
Figure 7A:
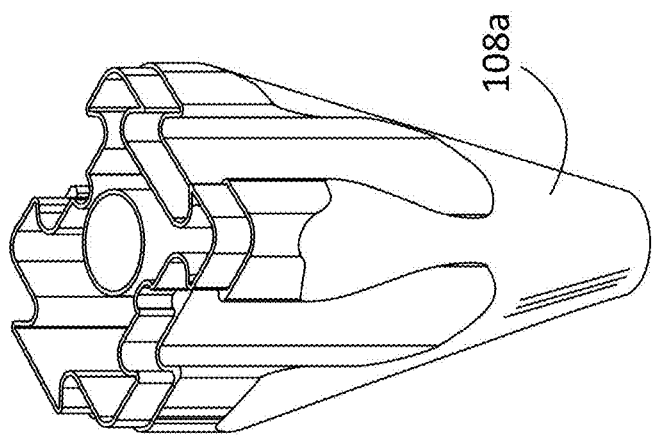
FIG. 7a illustrates a perspective view of a foundation shear attachment, in accordance with an embodiment of the present invention.

FIG. 7a illustrates a perspective view of a foundation shear attachment 108a with a circular opening for high pressure water and hydro jet path, in accordance with an embodiment of the present invention. A high pressure water and hydro jet can be fed through the foundation shear attachment 108a adhered to the foundation pilings 106a to assist in clearing a path to drive the piling into the ground to the desired depth.

Figure 7C:
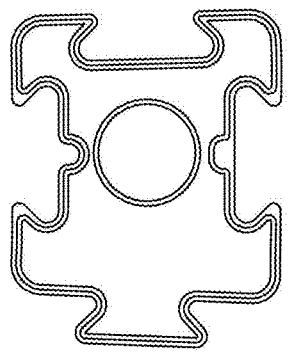
FIG. 7c illustrates a top view of a foundation shear attachment, in accordance with an embodiment of the present invention.
Figure 7B:
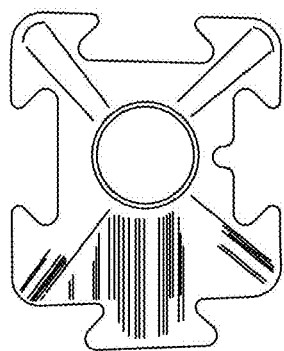
FIG. 7b illustrates a bottom view of a foundation shear attachment, in accordance with an embodiment of the present invention.

FIG. 7b illustrates a bottom view of a foundation shear attachment 108a with circular opening for high pressure water and hydro jet path, in accordance with an embodiment of the present invention.

FIG. 7c illustrates a top view of a foundation shear attachment 108a with circular opening for high pressure water and hydro jet path, in accordance with an embodiment of the present invention.

FIG. 7d illustrates a side view of a foundation shear attachment 108a, in accordance with an embodiment of the present invention. The shear attachment will have 2-6 inches openings in the middle to allow water jet/hydro jet systems to blast dense surface substrate such as limestone, sand, rocks, and other hindering material. The opening in the middle of the shear attachment will allow high power PSI of water jet/hydro jet pressure to blast a pathway and break apart obstructive material and debris for the piling's installation in the substrate of the ocean and other bodies of water.

Figure 8C:
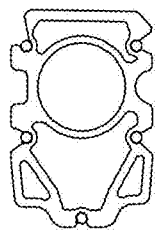
FIG. 8c illustrates a top view of a rebar guide, in accordance with an embodiment of the present invention.
Figure 8A:
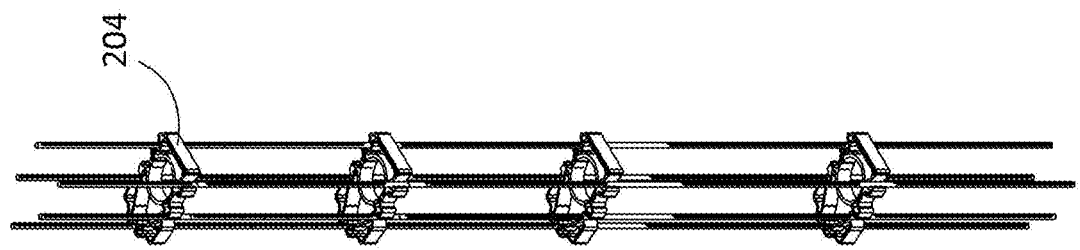
FIG. 8a illustrates a perspective view of a rebar guide, in accordance with an embodiment of the present invention.

FIG. 8a illustrates a perspective view of a rebar guide 204 with circular opening for high pressure water and hydro jet path, in accordance with an embodiment of the present invention. The rebar guide 204 is fitted inside the foundation piling 106a.

Figure 8B:
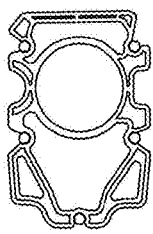
FIG. 8b illustrates a bottom view of a rebar guide, in accordance with an embodiment of the present invention.

FIG. 8b illustrates a bottom view of a rebar guide 204 with circular opening for high pressure water and hydro jet path, in accordance with an embodiment of the present invention.

FIG. 8c illustrates a top view of a rebar guide 204 with circular opening for high pressure water and hydro jet path, in accordance with an embodiment of the present invention.

FIG. 9a illustrates a side view of the foundation piling 106a interlocking with the indigenous aquatic habitat planter assembly 117 in accordance with a modular embodiment of the present invention. These interlocking modular smart seawall diversion and recreation system (Smart Seawall) pieces can be installed as a comprehensive group or individually depends on the site/environmental situation, (calm or rough water, inner or outer costal) and the functionality of intent usage. Also, the Smart Seawall can be for used inland structural application. The structural support of the indigenous aquatic habitat planter assembly 117 gives to the present invention is shown. Extension structure 116d interlocks and fastens to the foundation pilings 106a. Locking seal cover 119 seals openings in the foundation pilings from the elements. Integrated utility components 134 are integrated into the foundation pilings below the locking seal cover 119. This provides an electrical connection for light and other things of that nature. The architectural structural frame connections and extension structure 116d can be used with permanent and floating docks, or any other architectural structural applications.

FIG. 9b illustrates a top view of the foundation pilings 106a interlocking with the indigenous aquatic habitat planter assembly 117, in accordance with an embodiment of the present invention.

FIG. 9c illustrates a perspective view of the foundation pilings 106a interlocking with the indigenous aquatic habitat planter assembly 117, in accordance with an embodiment of the present invention.

FIG. 10a illustrates a perspective view of a combination foundation piling interlocking system to in a straight line formation and architecture structure applications, in accordance with an embodiment of the present invention. Illustrated is the foundation pilings 106a and foundation shear attachments 108a driven into the ground surface 104.

FIG. 10b illustrates a front view of a combination foundation piling interlocking system and architecture structure applications, in accordance with an embodiment of the present invention. The grooves of the foundation piling interlocking modular system is designed for both permanent and temporary locking systems, such as the installation of the indigenous aquatic elements (ARS), architectural structural frame connections/braces/joints for permanent and floating docks, or any other architectural structural applications. When installed the slight curve design of the foundation piling gives the installer the unique ability to create a concave, convex, or straight seawall by alternating the orientation of the foundation piling's directional groove guide.

FIG. 10c illustrates a sectional view of a combination foundation piling interlocking system and architecture structure applications, the section taken along line 10c-10c of FIG. 10b, in accordance with an embodiment of the present invention.

FIG. 11a illustrates a front view of one of the embodiments of the Interlocking Modular Smart Seawall Diversion and Recreation System (Smart Seawall) featuring the diverter section which absorbs and redirects destructive wave energy, platform and architectural elements. It also illustrated installation of the Smart Seawall, in accordance with an embodiment of the present invention. FIG. 11a shows a modular embodiments: the foundation piling 106a, foundation shear attachment 108a, indigenous aquatic habitat planter assembly 117 and indigenous aquatic habitat planter assembly 116b and interlocking support structure 116c, interlocking overflow deflector 114, serviceable skylight portal panel 120a, locking in seal cover 119, diverter block path 110, skylight portals 206 and direct lower absorption diverter structures 102. These combinations are designed for modular interlocking to absorb and re-direct destructive wave energy. In addition, creates a path for aquatic habitat under platform. This holistic approach creates a prime living space for both marine life and humanity.

FIG. 11b illustrates a perspective view of one of the embodiment of the Interlocking Modular Smart Seawall Diversion and Recreation System (Smart Seawall) featuring the diverter section which absorbs and redirects destructive wave energy, platform and architectural elements. It also illustrated installation of the Smart Seawall, in accordance with an embodiment of the present invention.

FIG. 11c illustrates a side view of one of the embodiment of the Interlocking Modular Smart Seawall Diversion and Recreation System (Smart Seawall) featuring the diverter section which absorbs and redirects destructive wave energy, platform and architectural elements. It also illustrated installation of the Smart Seawall and show open void between foundation piling 108n and 106a for marine life to fosters, in accordance with an embodiment of the present invention.

FIG. 12a illustrates a front view of one of the embodiment of Interlocking Modular Smart Seawall Diversion and Recreation System (Smart Seawall) without the diverter section but with platform, architectural elements and the severable skylight panels which bring light to open void between foundation piling 108n and 106a for marine life to fosters, in accordance with an embodiment of the present invention. FIG. 12 depicts various combinations of modular embodiments foundation piling 106a, foundation shear attachment 108n, indigenous aquatic habitat planter assembly 117, interlocking overflow deflector 114, serviceable skylight portal panel 120a, locking in seal cover 119, and integrating utilities components 134. These combinations are designed for inner coastal use where mild wave energy is typical. In addition, it creates a path for aquatic habitat under the platform.

FIG. 12b illustrates a perspective view of one of the embodiment of the Interlocking Modular Smart Seawall Diversion and Recreation System (Smart Seawall) without the diverter section but with platform, architectural elements and the severable skylight panels which bring light to open void between foundation piling 108n and 106a for marine life to fosters, in accordance with an embodiment of the present invention.

FIG. 12c illustrates a side view of one of the embodiment of the Interlocking Modular Smart Seawall Diversion and Recreation System (Smart Seawall) without the diverter section but with platform, architectural elements and the severable skylight panels which bring light to open void between foundation piling 108n and 106a for marine life to fosters, in accordance with an embodiment of the present invention.

Figure 13:
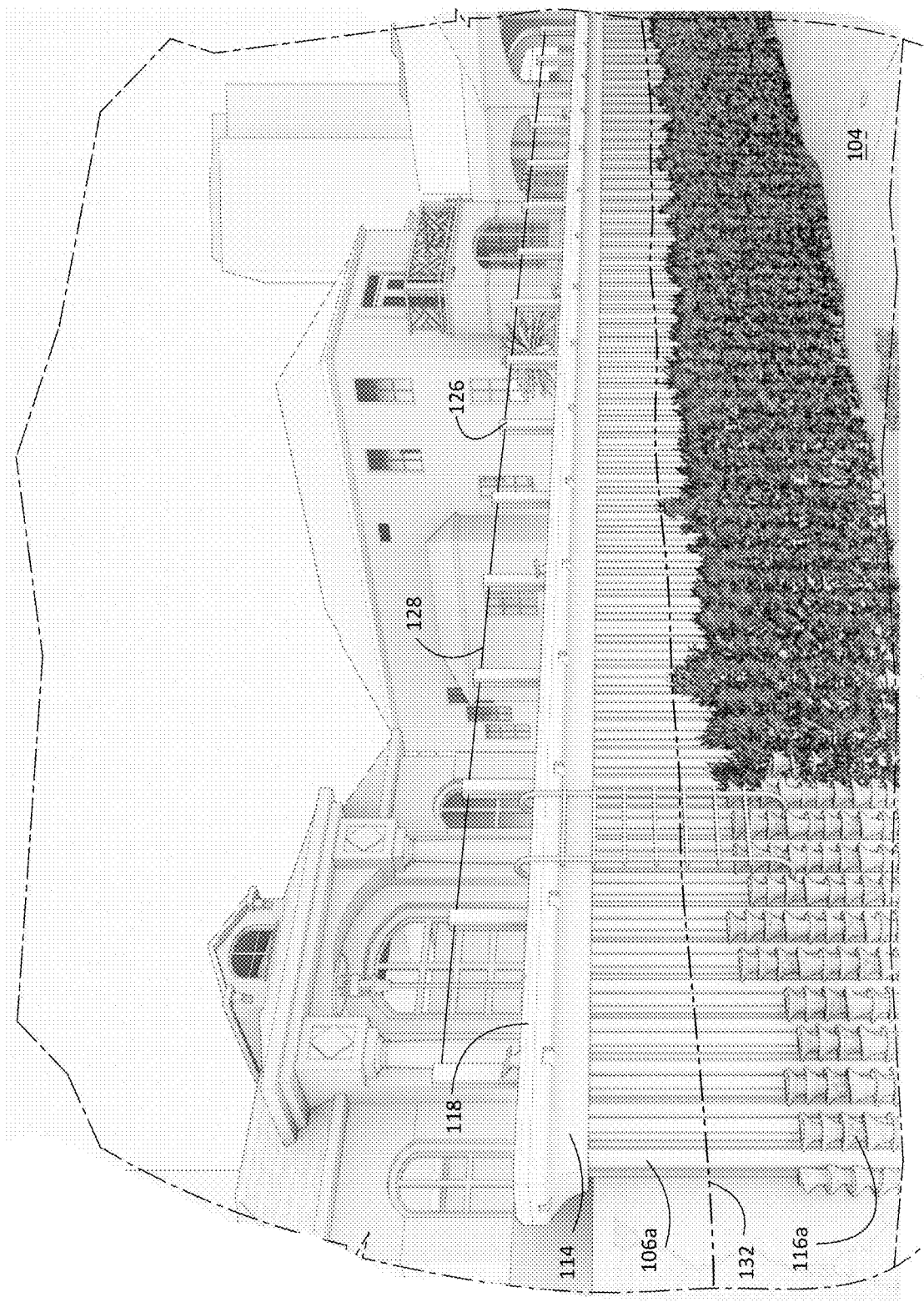
FIG. 13 illustrates a perspective view of the Interlocking Modular Smart Seawall Diversion And Recreation System And Method Of Installation (Smart Seawall) without the diverter section primarily for recreation purpose/living outdoor space in accordance with an embodiment of the present invention.

FIG. 13 illustrates a perspective view of the Interlocking Modular Smart Seawall Diversion and Recreation System (Smart Seawall) without the diverter section primarily for shoreline protection, recreation purpose/living out door space, and provide habitat for marine life, in accordance with an embodiment of the present invention. FIG. 13 shows a combination of the foundation piling 106a, indigenous aquatic habitat planter assembly 117, interlocking overflow deflector 114, locking in seal cover 119, interlocking architecture elements 126 and temper glass railing panel 128. These combinations are designed for shoreline protection in mild wave energy environments while providing marine and human habitat, such as inner coastal shoreline areas.

Figure 14:
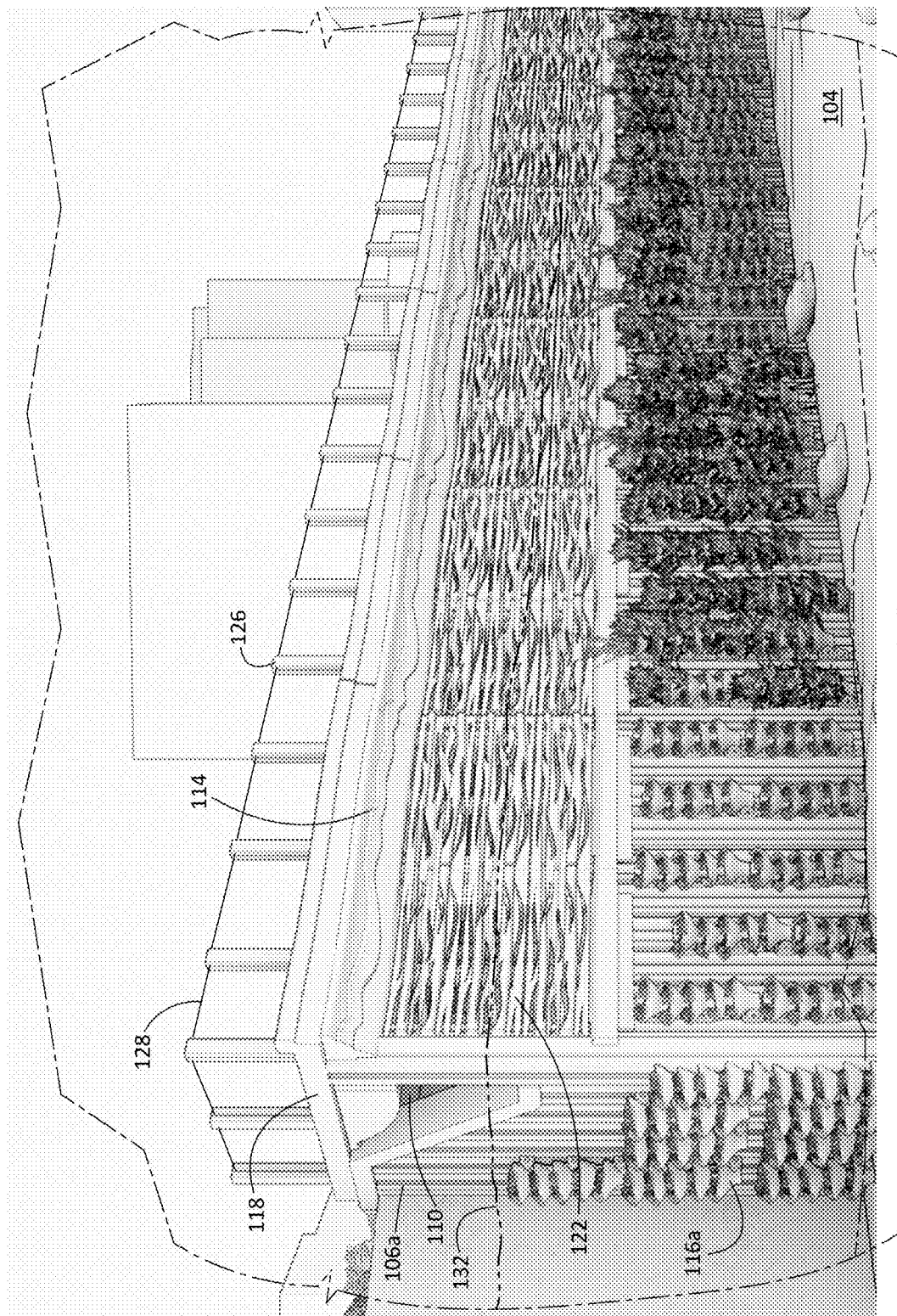
FIG. 14 illustrates a perspective view of the Interlocking Modular Smart Seawall Diversion And Recreation System And Method Of Installation (Smart Seawall) featuring the diverter section which absorbs and redirects destructive wave energy in accordance with an embodiment of the present invention.

FIG. 14 illustrates a perspective view of the Interlocking Modular Smart Seawall Diversion and Recreation System (Smart Seawall) featuring the diverter section which absorbs and redirects destructive wave energy in accordance with an embodiment of the present invention. FIG. 14 depicts how several of modular embodiments are used in various combinations. FIG. 14 shows various combinations of the foundation piling 106a, indigenous aquatic habitat elements (ARS) 116a, interlocking overflow deflector 114, locking in seal cover 118, interlocking architecture elements 126, temper glass railing panel 128, diverter block path 110 and interlocking finished flow panels 122. These combinations are the ultimate application for shoreline protection from destructive wave energy while providing marine and human habitat. The modular components are manufactured with a corrosion resistant polymer, like a fiberglass reinforced plastic (FRP), Polyvinyl Chloride (PVC), or High-Density Polyethylene (HDP). Other materials may be considered as cost, performance, or customer requirements change over time.

Figure 15:
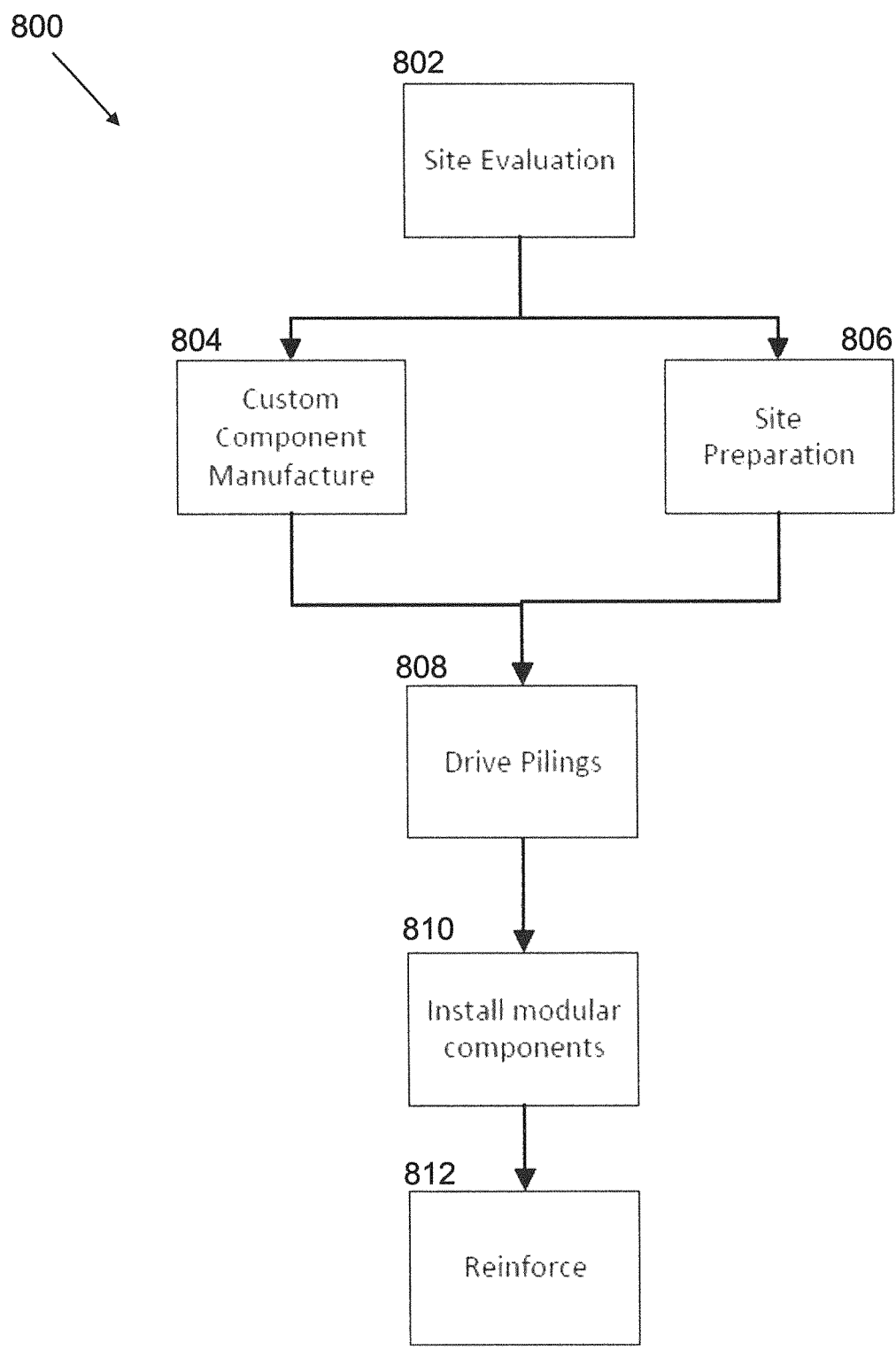
FIG. 15 illustrates a flowchart of an exemplary method of installing an interlocking modular seawall diversion and recreation system, in accordance with an embodiment of the present invention.

FIG. 15 illustrates a flowchart of an exemplary method of installing an interlocking modular seawall diversion and recreation system, in accordance with an embodiment of the present invention. FIG. 15 references a method 800 of installing the modular seawall diversion and recreation system. Method 800 includes an initial Step 802 of evaluating the site along the shoreline. For installation, on-site location at the shoreline is measured for accuracy prior to the work commencing. This will allow specific modular components to be manufactured to size by an offsite or onsite manufacturing facility.

A Step 806 includes preparing the site for installation. In determining the style of system, a barrier island configuration, a river bank, or a stand-alone structure in a body of water may be used. The majority of the structural elements are the same, but the internal diverter sections may change geometry to accommodate the different function of redirecting sand in specific directions versus redirecting water along a 180° return path.

After an installation team prepares the job site and interlocks the diverter sections, the foundation pilings are erected. Thus, a Step 808 comprises driving the pilings into the ground. After being driven to the desired depth in the ground, a concrete truck pours concrete from the top end of the foundation pilings. This locks all the wall sections vertically, adds stability to the entire structure, and is more effective than the past methods of piling rock or other debris to prevent erosion. It is also significant to note that the components are fabricated from fiber reinforced plastic (FRP) or comparable materials that suffer little to no chemical corrosion.

Consequently, little physical corrosion occurs as the main energy of the wave is redirected up and/or back towards the body of water. A Step 810 includes installing the diverter sections, the diverter sections, the platform, and other components. The modular design of the wall sections allows for a small crew of workers (homeowner or professional) to successfully install the components. The wall sections and the diverter sections are sized and designed to fit onto a standard truck bed. Upon arrival at the job site, the components are designed so each can be lifted by a small crew or heavy equipment (crane and excavator, loader). The components are designed to stack on each other in a locking fashion, allowing the design to be easily modified to the jobsite. Similar to Legos™, the system provides great flexibility along a shoreline.

In some embodiments, a final Step 812 may include reinforcing the system with concrete poured into the wall sections and the foundation pilings. The diverter sections lock together to form a series of open cavities that can be filled from the top with concrete. By following such installation guidelines, the method 800 creates numerous desirable advantages. For example, the components have 'slop' between them during installation to accommodate site geometries and easier installation. Additionally, the concrete reinforcement locks the geometries in place; and there will be minimal welding and 'hard' connections as possible.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. An interlocking modular smart seawall diversion and recreation system, the system comprising:
   one or more diverter sections arranged in a side-by-side configuration, the diverter sections defining a rear face and an opposing front face that orients towards incoming waves, the diverter sections further defining a base end oriented towards a ground surface and an opposing upper end, the diverter sections being configured to slope upwardly from the base end to the upper end;
   the diverter sections comprising multiple steps consisting of a curved riser and a tread,
   multiple foundation pilings configured to support the diverter sections, the foundation pilings defining an interior cavity, a top end engaging the diverter sections, and a bottom end engaging the ground,
   the foundation pilings having one or more longitudinal grooves configured to enable flowage of a porous material that encourages aquatic growth from the top end to the bottom end, the one or more longitudinal grooves of the foundation pilings are configured to removably engage with at least one indigenous aquatic element;
   a rebar guide disposed inside the cavity of the foundation pilings, the rebar guide traversing across the cross section of the foundation pilings;
   a diversion block joined with the top end of the foundation pilings, the diversion block defining a diversion path configured to enable passage of the waves that reach the upper end of the diverter sections, the diversion path further being configured to recirculate back to a diverter chamber,
   the diversion block further defining multiple cement holes aligned with the top end of the foundation pilings, the cement holes enabling passage of cement or filler into the cavity of the foundation pilings,
   the diversion block further defining multiple piling coupling protrusions configured to couple with the top end of the foundation pilings;
   a skylight portal configured to be removable from the diversion block for removing debris and aquatic wildlife, the skylight portal further being configured to support an LED strip or electric components and provide light source for an indigenous aquatic habitat elements;
   a platform joined with the upper end of the diverter sections in a perpendicular relationship, whereby the platform is horizontal, the platform defining a bottom surface oriented towards the ground and an opposing top surface, the platform defining multiple apertures, at least one of the apertures being in fluid communication with the diversion path; and an interlocking support structure attached to the platform and the diverter sections that supports at least one indigenous aquatic habitat element.

2. The system of claim 1, further comprising a filling material disposed behind the rear face of the diverter sections for enhancing structural integrity.

3. The system of claim 1, wherein the indigenous aquatic habitat element is a shelf or planter configured with a curved surface to absorb and direct wave energy.

4. The system of claim 3, wherein the planter has a fastening anchor that removeably engages with the one or more longitudinal grooves of the foundation pilings and a locking wedge and the planter comprising a generally bowl shaped housing with a bottom, a rim and a curved face that is configured to slope upwardly from about 35 degrees from the bottom of the bowl to the rim that absorbs and diverts wave energy outwardly toward the incoming wave.

5. The system of claim 1, wherein the system is fabricated from a composite material, the composite material including at least one of the following: a corrosion resistant polymer, a fiberglass reinforced plastic (FRP), a Polyvinyl Chloride (PVC), and a High-Density Polyethylene (HDP).

6. The system of claim 1, wherein the diverter sections are configured to slope upwardly from about 10°-75° from the base end to the upper end.

7. The system of claim 1, wherein the top end of a portion of the foundation pilings engages the upper end of the diverter sections, and the top end of a portion of the foundation pilings engage the base end of the diverter sections.

8. The system of claim 1, further comprising a sheared attachment joined with the bottom end of the foundation pilings, the sheared attachment having a tapered cross section and an opening edge configured for penetrating and anchoring into the ground.

9. The system of claim 1, further comprising multiple overflow deflectors joined with the upper end of the diverter sections wherein the diverter section is open to create sanctuary for marine life.

10. The system of claim 1, further comprising multiple flow panels arranged in an interlocking, side-by-side relationship, the flow panels connected to the longitudinal grooves along the foundation pilings.

11. The system of claim 8, wherein the flow panels comprise an ornamental configuration configured to change colors, and multiple openings configured to enable passage of water and restrict passage of debris.

12. The system of claim 1, further comprising an aquatic base seal configured to cover the top end of the foundation pilings.

13. The system of claim 1, wherein the indigenous aquatic habitat element comprises a column or an irregular surface configured to absorb and direct wave energy.

14. The system of claim 1, wherein the diversion path comprises a channel or an opening.

15. The system of claim 1, further comprising one or more architectural members joined with the top surface of the platform, the architectural members include at least one of the following: recreational accessory anchor, plantings, a fence post, a column, a roof, an electrical components, permanent and floating docks, and outdoor furniture.

16. The system of claim 14, further comprising multiple transparent fence panels arranged along the architectural members.

17. The system of claim 1, further comprising integrated electric utilities disposed inside the body of the platform.

18. The system of claim 1, further comprising an aquatic habitat element disposed at or near the diverter sections, the aquatic habitat element configured to form a habitat for indigenous aquatic wildlife.

19. An interlocking modular smart seawall diversion and recreation system, the system comprising:
one or more diverter sections arranged in a side-by-side configuration, the diverter sections defining a rear face and an opposing front face that orients towards incoming waves, the diverter sections further defining a base end oriented towards a ground surface and an opposing upper end, the diverter sections being configured to slope upwardly from the base end to the upper end;
the diverter sections comprising multiple steps consisting of a curved riser and a tread;
multiple foundation pilings each having an interior cavity, one or more longitudinal grooves, a top end engaging a structural support section, and a bottom end engaging the ground to support the diverter sections, and
at least one indigenous aquatic element removably attached to the multiple foundation pilings having one or more longitudinal grooves; and
a diversion block joined with the top end of the foundation pilings, the diversion block defining a diversion path configured to enable passage of the waves that reach the upper end of the diverter sections, the diversion path further being configured to recirculate back to a diverter chamber.

20. A method for installing a modular seawall diversion and recreation system, the method comprising:
evaluating a shoreline site;
manufacturing foundation pilings, foundation shear attachments, diverter sections, wall sections, a platform, and aquatic habitat elements offsite or onsite;
preparing the site for installation;
attaching the foundation shear attachments to the foundation pilings;
driving the foundation pilings into the ground while feeding a high pressure water stream through the foundation pilings;
installing the diverter sections, the wall sections, the platform, and the aquatic habitat elements; and
reinforcing the system by pouring concrete into any openings of the wall sections, the platform and the foundation pilings.

* * * * *